United States Patent
Fischer et al.

(10) Patent No.: US 9,481,466 B2
(45) Date of Patent: Nov. 1, 2016

(54) POWERED SEAT AND CONTROL THEREOF

(71) Applicant: ITT Manufacturing Enterprises LLC, Wilmington, DE (US)

(72) Inventors: Brian Fischer, Pasadena, CA (US); Stephen McIntyre, Valencia, CA (US); Robert D. Matusek, Brecksville, OH (US)

(73) Assignee: ITT Manufacturing Enterprises LLC, Wilmington, DE (US)

( * ) Notice: Subject to any disclaimer, the term of this patent is extended or adjusted under 35 U.S.C. 154(b) by 76 days.

(21) Appl. No.: 14/316,167

(22) Filed: Jun. 26, 2014

(65) Prior Publication Data

US 2015/0375865 A1   Dec. 31, 2015

(51) Int. Cl.
*B60R 22/00* (2006.01)
*B64D 11/06* (2006.01)
(Continued)

(52) U.S. Cl.
CPC ............. *B64D 11/064* (2014.12); *B60N 2/02* (2013.01); *B60N 2/0232* (2013.01); *B60N 2/0244* (2013.01); *B60N 2/06* (2013.01); *B60N 2/16* (2013.01); *B60N 2/22* (2013.01); *B60N 2/442* (2013.01); *B60N 2/443* (2013.01); *B60N 2/449* (2013.01); *B60N 2/4435* (2013.01); *B60N 2/4495* (2013.01); *B60N 2/464* (2013.01); *B60N 2/4808* (2013.01); *B60N 2/62* (2013.01);
(Continued)

(58) Field of Classification Search
CPC  B64D 11/064; B64D 11/0639; G05B 15/00; G06F 15/16; B60R 16/037; B60Q 1/42; B60Q 2310/12; G05D 3/00; G06G 7/08; G01C 25/00; B60N 2/0248; B60N 2/0244; B60N 2/002
USPC ........ 701/49, 36; 709/204; 700/275; 73/800; 250/221; 720/94; 297/311, 330, 217.1, 297/217.3
See application file for complete search history.

(56) References Cited

U.S. PATENT DOCUMENTS 4,747,565 A    5/1988   Spinosa et al.
4,787,576 A    11/1988  McGrady et al.
(Continued)

FOREIGN PATENT DOCUMENTS

DE      20212142 U1       8/2002
DE      102004037913      8/2006
(Continued)

OTHER PUBLICATIONS

European Patent Office, International Search Report and Written Opinion from PCT/US2015/037863, dated Sep. 11, 2015 (total 13 pages).

*Primary Examiner* — Shardul Patel
(74) *Attorney, Agent, or Firm* — Barclay Damon, LLP

(57) ABSTRACT

A method of controlling motion of movable components of a powered seat includes, using the controller, monitoring a feedback signal of an actuator during motion of a component. During an acceleration phase of the motion of the component, a reference state of the time-varying motion command is detected and a reference value of the monitored feedback signal is determined as a reference value. A feedback-signal acceptance range is determined using the reference value of the monitored feedback signal. During a steady-state phase of the motion, the motion of the component is terminated if the monitored feedback signal departs the determined feedback-signal acceptance range. A control system for a powered seat of a vehicle is described. A powered seat assembly is described.

12 Claims, 8 Drawing Sheets

(51) Int. Cl.
  *B60N 2/46* (2006.01)
  *B60N 2/48* (2006.01)
  *B60N 2/62* (2006.01)
  *B60N 2/66* (2006.01)
  *B60N 2/02* (2006.01)
  *B60N 2/06* (2006.01)
  *B60N 2/16* (2006.01)
  *B60N 2/22* (2006.01)
  *B60N 2/44* (2006.01)

(52) U.S. Cl.
  CPC ............ *B60N2/66* (2013.01); *B64D 11/0639* (2014.12); *B60N 2002/0268* (2013.01); *B60N 2002/0272* (2013.01); *B60N 2002/4425* (2013.01)

(56) References Cited

U.S. PATENT DOCUMENTS

| | | | |
|---|---|---|---|
| 5,064,146 A | 11/1991 | Tung | |
| 5,301,902 A | 4/1994 | Kalberger et al. | |
| 5,335,884 A | 8/1994 | Kalberger et al. | |
| 5,556,056 A | 9/1996 | Kalberger et al. | |
| 5,558,301 A | 9/1996 | Kerdoncuff et al. | |
| 5,651,587 A * | 7/1997 | Kodaverdian | B60N 2/0228 297/362.14 |
| 6,227,489 B1 | 5/2001 | Kitamotor et al. | |
| 6,523,417 B1 * | 2/2003 | Donahue | B60N 2/0224 250/221 |
| 6,731,088 B2 * | 5/2004 | Nivet | B60N 2/0244 297/311 |
| 6,949,904 B2 | 9/2005 | Rumney | |
| 7,194,657 B2 | 3/2007 | Wagner | |
| 7,213,882 B2 | 5/2007 | Dryburgh et al. | |
| 7,342,370 B2 * | 3/2008 | Greene | B60N 2/0232 318/139 |
| 7,546,215 B2 * | 6/2009 | Muhammad | B64D 11/06 702/94 |
| 8,126,616 B2 * | 2/2012 | Phipps | B60N 2/448 296/63 |
| 8,283,801 B2 | 10/2012 | Petitpierre | |
| 8,408,643 B2 | 4/2013 | Honnorat | |
| 8,457,846 B2 | 6/2013 | Fischer et al. | |
| 2003/0182043 A1 * | 9/2003 | Christiansen | G05B 19/0421 701/49 |
| 2005/0052060 A1 * | 3/2005 | Beloch | B60N 2/0228 297/284.7 |
| 2005/0121959 A1 * | 6/2005 | Kruse | A61G 5/006 297/330 |
| 2006/0004505 A1 | 1/2006 | Christiansen et al. | |
| 2008/0252116 A1 * | 10/2008 | Phillips | A61H 1/003 297/217.1 |
| 2008/0255788 A1 * | 10/2008 | Muhammad | B64D 11/06 702/94 |
| 2011/0282495 A1 * | 11/2011 | Fischer | B60N 2/0224 700/275 |
| 2013/0113250 A1 * | 5/2013 | Udriste | B64D 11/06 297/217.3 |
| 2013/0317704 A1 | 11/2013 | Fischer et al. | |
| 2014/0001802 A1 | 1/2014 | Piaulet et al. | |

FOREIGN PATENT DOCUMENTS

| | | |
|---|---|---|
| EP | 1432593 B1 | 5/2006 |
| EP | 0957025 B1 | 4/2007 |
| EP | 1650075 B1 | 1/2013 |
| EP | 2639156 | 9/2013 |
| GB | 24797332 | 6/2013 |
| JP | 3417868 B2 | 6/2003 |
| WO | WO03002256 | 1/2003 |
| WO | WO03031220 | 4/2003 |
| WO | WO03037673 | 5/2003 |
| WO | WO 03047905 A2 | 6/2003 |
| WO | WO03082672 | 10/2003 |
| WO | WO2011143357 | 11/2011 |
| WO | WO2012123487 | 9/2012 |
| WO | WO2013070840 | 5/2013 |

* cited by examiner

POWERED SEAT AND CONTROL THEREOF

TECHNICAL FIELD

The present application generally relates to powered seats, and more particularly, to an actuation control system for aircraft seats.

BACKGROUND

Modern airplane seats, and, in particular, seats in the premium sections of a passenger airplane such as first class, are powered by actuators that enable portions of the seat to be selectively adjustable between a number of seating positions. The range of these positions may vary. For example, some powered seats may be adjustable between an upright position and a reclined position, while other seats can recline to a substantially flat position in order to function as a bed. Additionally, some airplane seats have a head rest and a foot rest that can be separately adjusted to provide a comfortable seating position. The various adjustable features of the seat are accessible and controllable using a passenger control unit, some of which may include a touchscreen or a keyboard with a display.

In use and given the confined space within an aircraft, there can be the possibility of objects, e.g., carry-on luggage items, being pinched between at least one moving section of the powered seat and an adjacent section of the seat, a bulkhead, privacy screen, or other immovable object. Such a pinch event is referred to herein as an "obstruction," and the areas in which obstructions can occur are referred to as "pinch points." Obstructions can result in damage to pinched objects. There is, therefore, a need for techniques to mitigate or avoid damage or injury resulting from obstructions.

Various attempts have previously been made to address the detection of potential obstructions in powered aircraft seats. For example, DE102004037913A1 by Baumann describes foil sensors arranged on the seat in and around pinch points. When an obstruction is detected, e.g., by sensing pressure exerted on the foil sensors by the pinched object, a control system can stop, start, or retract seat components in order to relieve the obstruction. However, this system requires the incorporation of additional sensors, which add weight and potential failure modes. Particularly for aviation uses, extra weight is undesirable.

GB2497332 by Jerrett describes measuring a current drawn by a seat actuator to determine when an obstruction has occurred. This scheme uses the position of the output shaft of the actuator to determine a threshold at which it will be determined that an obstruction is present.

It has been determined that the load on a seat, e.g., the weight of a passenger, can have a significant effect on the actuator current required to move components of an aircraft seat. In a example, to recline a tested seatback against the spring urging that seatback upright, a current of ~1 A was required if the seat was empty (more current than to move the seat upright), but a current of only ~400 mA was required if the seat was holding a 250 lb. passenger leaning against the seat back (less current than to move the seat upright). This difference can confound schemes such as those noted above that simply use actuator current to detect obstructions. Moreover, significant variations in passenger weight are not uncommon. The FAA standard average passenger weights set forth in Advisory Circular (AC) 120-27E, Jun. 10, 2005, range between 82 lb for a child in summer and 205 lb for a male adult in winter. Moreover, unoccupied seats being moved automatically or by cabin personnel can participate in obstructions with respect to nearby bulkheads or seats.

This difference is especially significant because many mechanical designs of powered seat actuators are nonlinear in behavior over their range of motion. The loads on such designs change dynamically in both position and direction as the actuators traverse. Various prior schemes are not capable of taking such nonlinear behavior into account.

U.S. Pat. No. 6,949,904 to Rumney attempts to determine whether a seat is occupied using current data, and to and adjust actuator force accordingly. However, Rumney does not describe detection of obstructions. There is, therefore, a continuing need for a way of detecting obstructions even in the face of variation in the load placed on a seat, e.g., by a passenger sitting therein.

BRIEF DESCRIPTION

According to an aspect of the invention, there is provided a method of controlling the motion of movable components of a powered seat, the powered seat including a controller responsive to a time-varying motion command and at least one actuator for moving the components over a range of positions, the method comprising:
  using the controller, monitoring a feedback signal of the at least one actuator during the motion of at least one component;
  during an acceleration phase of the motion of the component, automatically detecting a reference state of the time-varying motion command;
  determining a reference value of the monitored feedback signal corresponding to the reference state of the time-varying motion command using the controller;
  automatically determining a feedback-signal acceptance range using the reference value of the monitored feedback signal; and
  during a steady-state phase of the motion, automatically terminating the motion of the at least one component if the monitored feedback signal departs the determined feedback-signal acceptance range.

According to another aspect of the invention, there is provided a powered seat assembly, comprising:
  a) a back support;
  b) a seat pan having a rearward portion associated with the back support;
  c) a leg rest having a first end associated with a forward portion of the seat pan, each of said back support, said seat pan and said leg rest being movable;
  d) one or more actuator(s) configured to move at least one of the back support, seat pan, and leg rest in response to one or more time-varying motion command(s), and to provide motion-status signal(s);
  e) a driver configured to provide the motion command(s) in response to a time-varying motion command and the motion-status signal(s);
  f) a sensor unit configured to monitor one or more time-varying feedback signal(s) of the actuator(s); and
  g) a controller configured to determine respective feedback-signal acceptance range(s) for at least one of the actuator(s) using value(s) of the respective feedback signal(s) monitored during an acceleration phase of motion of the respective actuator(s), and to terminate motion of the respective actuator(s) if the respective feedback signal(s) depart the respective feedback-signal acceptance range(s) during a steady-state phase of motion of the respective actuator(s).

According to yet another aspect of the invention, there is provided a control system for a powered seat of a vehicle, the seat including at least one component that is movable over a range of positions and an actuator responsive to a time-varying motion command to move the at least one component, the control system including:

a) a receiver for receiving a feedback signal of the actuator;
b) a transmitter for transmitting the time-varying motion command to the actuator; and
c) a controller connected to the receiver and the transmitter and configured to determine a feedback-signal acceptance range using the feedback signal during an acceleration phase of the time-varying motion command, and to terminate motion if the feedback signal departs the determined feedback-signal acceptance range during a steady-state phase of the time-varying motion command.

Various embodiments advantageously detect obstructions and termination motion of a seat component. Various embodiments advantageously use information gathered during the acceleration phase to define normal and abnormal range(s) of feedback-signal values during a movement. This permits effectively detecting obstructions using the same electronics and controls, whether the powered seat is empty or holding, e.g., a 250 lb. passenger. Various embodiments advantageously refine or adjust these range(s) during the movement to take into account changes in load or non-idealities of the motion system.

This brief description is intended only to provide a brief overview of subject matter disclosed herein according to one or more illustrative embodiments, and does not serve as a guide to interpreting the claims or to define or limit scope, which is defined only by the appended claims. This brief description is provided to introduce an illustrative selection of concepts in a simplified form that are further described below in the Detailed Description. This brief description is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

The above and other objects, features, and advantages will become more apparent when taken in conjunction with the following description and drawings wherein identical reference numerals have been used, where possible, to designate identical features that are common to the figures, and wherein.

The attached drawings are for purposes of illustration and are not necessarily to scale.

DETAILED DESCRIPTION

Throughout this description, some embodiments are described in terms that would ordinarily be implemented as software programs. Those skilled in the art will readily recognize that algorithms according to various embodiments described herein may be embodied as systems or methods, and that the equivalent of such software can also be constructed in hardware, firmware, micro-code, or any combination of those. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, software components, and elements known in the art. Given the systems and methods as described herein, software not specifically shown, suggested, or described herein that is useful for implementation of any aspect is conventional and within the ordinary skill in such arts.

Figure 1:
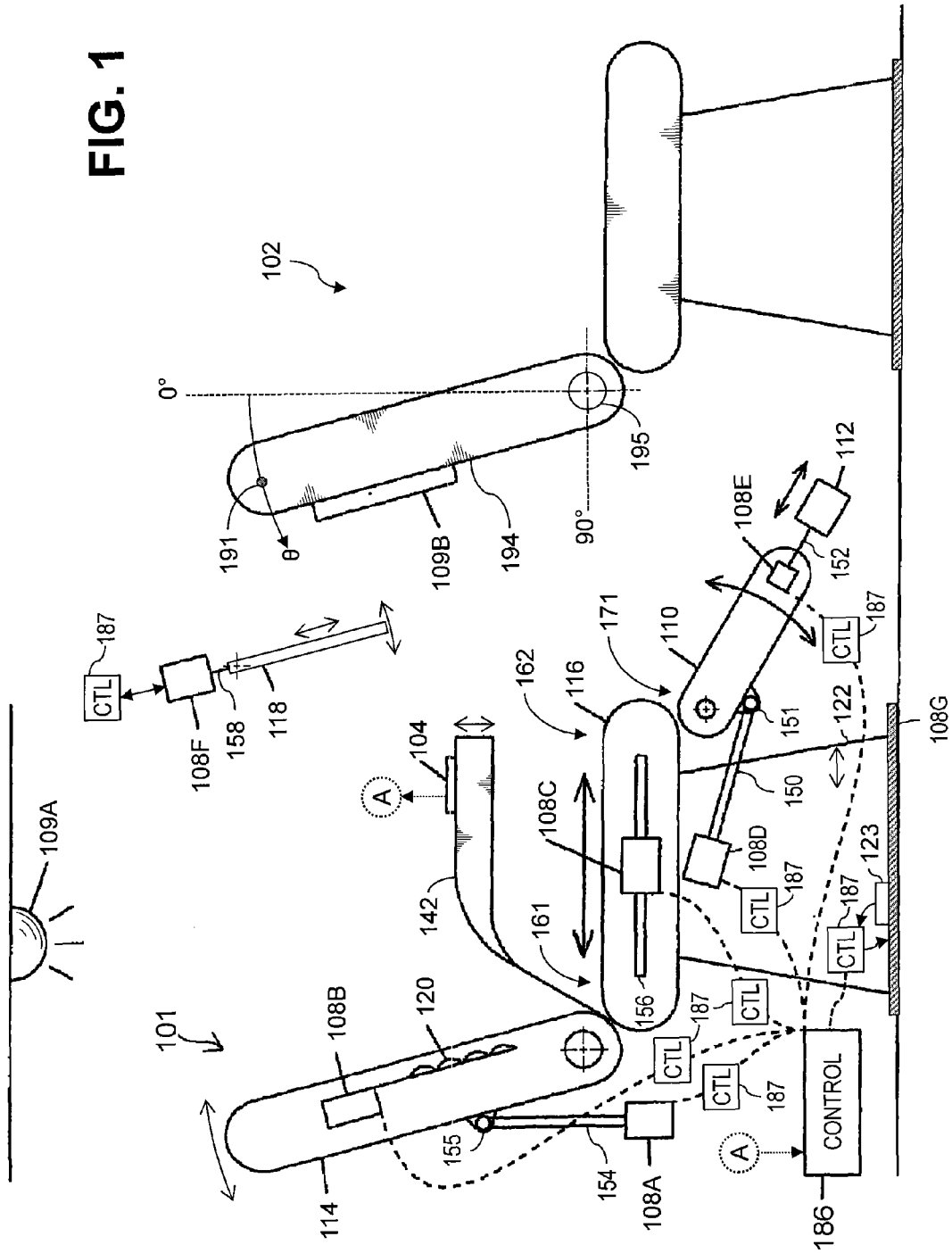
FIG. 1 illustrates a portion of an aircraft interior including exemplary aircraft passenger seats and a corresponding seat actuation control system.

FIG. 1 illustrates an exemplary powered seat assembly 101 (synonymously referred to herein as a "seat" for brevity), which is defined by a plurality of movable components, as discussed herein As would be common in a typical commercial aircraft, at least one powered seat assembly 102 is adjacently positioned. The seat 101 can be mounted to the floor of an aircraft cabin, e.g., by a mounting bracket supporting an actuator 108G, which in turn supports a seat frame 122. The seat 101 according to this exemplary embodiment includes a passenger control unit, such as a keypad 104, on an armrest 142, the controller 186 and one or more actuator(s) 108A-108G (collectively or individually referenced as 108) or other devices 109A, 109B. As used herein in reference to the seat 101, the term "component" refers to a portion of the seat 101 that is movable along a predetermined path using one of the actuators 108.

The seat 101 includes a back support 114, a seat pan 116 having a rearward portion 161 associated with the back support 114, and a leg rest 110 having a first end 171 associated with a forward portion 162 of the seat pan 116. Each of the back support 114, the seat pan 116, and the leg rest 110 according to this exemplary embodiment is movable along a predetermined path of travel. Corresponding actuators 108B, 108C, 108D are configured to move the back support 114, the seat pan 116, and the leg rest 110, respectively, in response to one or more time-varying motion command(s), e.g., from a controller 186 or 187. In various examples, the actuator 108G is configured to move the seat frame 122. The seat frame 122 can support the back support 114, the seat pan 116, the leg rest 110, or other components of the seat 101, either directly or via mounting brackets or other components. For example, the leg rest 110 can be mounted to the seat pan 116 and the seat pan 116 mounted to the seat frame 122; in this situation, the seat frame 122 is still considered to support the leg rest 110. When the seat frame 122 moves according to this embodiment, at least one of the back support 114, the seat pan 116, and the leg rest 110 is also configured to move with the seat frame 122. For example, the back support 114, the seat pan 116, and the leg rest 110 all move along predetermined paths of travel when the seat frame 122 is caused to move. Additionally, and though not discussed specifically herein, the seat 101 may include other movable components, e.g., rotary privacy dividers.

A passenger (not shown) sitting in the seat 101 uses the passenger control unit (e.g., the keypad 104) to adjust the position of the seat 101 or movable components thereof, or to control devices that are associated with the seat 101. According to this embodiment and by using the keypad 104), a passenger (not shown) can control a cabin lighting device 109A (e.g., a dome light or spot light), a video device 109B, an audio device (not shown) or other devices. For convenience, a device associated with a seat 101 such as an actuator 108 or another device 109A, 109B or other device mentioned herein can be referred to in the discussion that follows as a "seat device." Seat devices are collectively or individually referenced as 109 herein. In various examples, the passenger control unit can also provide the passenger with the ability to adjust the environmental conditions around the seat, such as lighting, temperature and the like. Seat devices 109 can therefore include, e.g., lights or fans. Furthermore, the passenger control unit can allow the passenger to operate various entertainment devices and features associated with the seat, such as a display screen in the video device 109B for viewing movies. Other examples of seat devices 109 include a touch screen suite control unit (SCU), multiple pushbutton passenger control units (PCU), armrest one-touch quick access buttons (QAB), ambiance lighting, a personal reading light, an aft reading light, an aft bulkhead wash lights, an aisle privacy divider light, a TTOL light, a bottle compartment light and various stowage lights. Seat devices 109 such as these latter components can be integrated with the seat 101 or provided separately therefrom.

Still referring to FIG. 1 and to move the seat 101, the keypad 104 (or another control device discussed below) communicates with the controller 186 (as indicated by connector A), which, in turn, controls the actuators 108 or directs corresponding controller(s) 186 or 187 to operate the actuators 108 in order to selectively manipulate various aspects of the seat. Each of the actuators 108 can include, e.g., a full-size rotary actuator, a compact rotary actuator, a full-size thru-shaft linear actuator, a full-size extension-shaft linear actuator, or a compact extension-shaft linear actuator, depending on the application for which the actuator is used. Linear actuators can include rack-and-pinion structures or lead screws. Actuators can include friction brakes, electrically released friction brakes, or other structures to hold position when not in motion. In addition, each actuator can include one or more position determining devices such as a transducer or sensor (not shown). For example, each of the actuators 108 can include a brushless direct-current (BLDC) motor and one or more Hall-effect sensor(s) or winding-current sensors that provide inputs to the motor commutation controller.

In various embodiments, one or more of the actuators 108 are equipped with a mechanical override system to permit placing the seat 101 in a taxi, take-off, and landing (TTOL) position manually in an event of a power loss to the seat 101, failure of the actuation system, software failure, or hardware failure. For example, the mechanical override mechanism can include a manual override lever operable by a person to disengage the actuator from the driven component, or to disengage the motor within the actuator from an end-effector of the actuator (e.g., a lead screw). After disengaging, the person can manually move the seat 101 or components thereof into a desired position.

In the illustrated exemplary embodiment, a linear-type actuator 108D can be used to move the leg rest 110 over an angular range of motion between a substantially vertical, retracted position and a substantially horizontal, extended position. The actuator 108D drives a bar 150 connected to a pivot 151 mounted to the leg rest 110. The pivot 151 is offset from an axis of angular rotation (shown near first end 171) of the leg rest 110. Therefore, linear motion of the bar 150 applies a torque about the axis of angular rotation. The pivot permits the torque to be applied substantially without bending either the bar 150 or the leg rest 110. In another example, the actuator 108D can drive the input link of a four-bar or other linkage, e.g., a planar quadrilateral linkage, and the output link of the linkage can move the leg rest 110.

In this exemplary embodiment, the actuator 108E axially moves a bar 152 that, in turn, moves foot rest 112 axially between a substantially extended and a substantially retracted position. The bar 152 can also support the foot rest 112, or the foot rest 112 can be supported by guide rails (not shown) parallel to the bar 152 or by a linkage (not shown). A four-bar or other linkage, e.g., a scissor extension arm, can be used in place of the bar 152.

In this exemplary embodiment, the actuator 108A moves the reclining back support 114 that moves from a substantially vertical position to a substantially horizontal position. The actuator 108A can include a linear actuator, as shown, or can include a rotary actuator operatively arranged with respect to an axis of rotation of the back support 114 to move the back support 114. In the example shown, the actuator 108A moves a bar 154 axially, and the bar 154 applies torque via a pivot 155 to the back support 114 around the axis of rotation of the back support 114.

In this exemplary embodiment, an actuator 108C axially moves the seat pan 116. In this example, the actuator 108C is mounted to the seat frame 122 and drives a bar 156 axially. The bar 156 is mounted to the seat pan 116.

In this exemplary embodiment, an actuator 108F moves a privacy screen 118. The actuator 108F can move a linear element such as a bar 158 that moves the privacy screen 118 axially. Alternatively, the actuator 108F can include a rotary actuator, a linear operator coupled to a linkage, to rotate the privacy screen 118 about an axis of rotation disposed proximal to an end thereof.

Still referring to FIG. 1 and in this exemplary embodiment, the actuator 108B drives or controls a lumbar bladder 120, e.g., by operating pump(s) to selectively inflate or deflate the lumbar bladder 120. In an example, the actuator 108B is a rotary actuator driving the rotor (not shown) of a peristaltic pump. The rotor includes roller(s) (not shown) that press a flexible air hose to drive air into or out of the lumbar bladder 120.

In this exemplary embodiment, the actuator 108G moves the seat frame 122 forwards and backwards, e.g., along a track in the floor of an aircraft cabin. The actuator 108G can include a motor (not shown) that rotates a lead screw (not shown). The seat frame 122 can be mounted via bearings to the track, and can include one or more nut(s) (not shown) connected to the lead screw so that when the motor turns, the seat frame will translate.

In this exemplary embodiment, the armrest 142 of the seat 101 can be vertically movable. "Vertically-movable" is not restricted to only motion normal to the floor of the cabin, but instead signifies that the armrest is capable of at least one motion out of a plane parallel to the floor. Such a motion can include tipping up and down or translating closer to or farther from the floor. One or more of the actuator(s) (not shown) can be configured to move the armrest 142 in response to at least one of the one or more time-varying motion command(s) and to provide corresponding motion-status signal(s). An actuator 108 configured to move the armrest 142 can include a rotational actuator to rotate the armrest 142 about an axis of rotation, e.g., at the end of the armrest 142 proximal to the back support 114; or can include a linear actuator such a leadscrew configured to bring the ends of a scissor extension arm closer together (to raise the armrest 142) or farther apart (to lower the armrest 142); or can include a linear actuator with linkage configured to move the armrest 142 vertically, rotationally, or a combination. Another exemplary actuator 108F can include a motor pulling a cable over one or more pulley(s), to raise and lower privacy screen 118.

The actuator(s) 108 in various exemplary embodiments are configured to provide motion-status signal(s), such as motor encoder counts or absolute encoder positions. In some examples, the actuator 108 directly provides motion-status signals. For example, the actuator 108 can include a PITTMAN motor and an associated encoder. In other examples, the motion-status signals are provided via a sensor associated with the actuator 108 to actuator controller 187. As shown in this exemplary embodiment, the actuator 108G is associated with a sensor 123 that reports the position of the seat frame 122 with respect to the actuator 108G or the cabin floor to the controller 186 via actuator controller 187. The sensor 123 (or a sensor on one of the actuators 108 other than the actuator 108G, and likewise throughout) can include a potentiometer, quadrature encoder, Hall-effect sensor, microswitches for position detection, or other devices for detecting the motion of the actuator 108 or a seat component driven thereby. The sensor 123 can be configured so that it accurately reports position even when the component is moved other than by the actuator 108. For example, a potentiometer mechanically coupled to the component driven by the actuator 108 can track the position of the component even when the actuator 108 is disconnected from the component, e.g., by a safety release, and the component is manually repositioned.

As used throughout this disclosure, the term "motion-status signal" refers to a signal indicative or representative of the actual position or motion of the actuator 108 or the seat component being driven by the actuator 108. The sensor 123 can provide a motion-status signal. The term "feedback signal" refers to a signal indicative or representative of resistance to the desired motion. In some embodiments, motion-status signals can be used as feedback signals or vice versa. In other embodiments, separate motion-status and feedback signals can be used. In other embodiments, separate signals serve those purposes. In various embodiments, feedback signals or motion-status signals are additionally indicative or representative of factors other than resistance or position/motion, respectively. Motion commands, motion-status signals, and feedback signals can be provided as analog, digital, or mixed signals, in any combination.

In an example, the actuator 108 includes a DC motor driving a pinion or worm gear that in turn moves a rack connected to a seat component. The motion-status signal(s) represent absolute position of a reference point on the rack, measured by a potentiometer or other position sensor 123. The feedback signals represent drive current of the DC motor. The motion command(s) represent voltages applied to the DC motor.

In various embodiments, the controller 186 can generate motion commands (e.g., drive signals) or other control signals for each of the actuators 108 and other devices and sends these signals to each actuator/device via separate connection leads. In addition, any signals from sensors in the actuators 108 are sent directly back to the controller 186. In other seat control systems, an actuator controller 187 is incorporated into each actuator assembly, and operation is coordinated by the controller 186. In various embodiments, the controller 186 sends commands to each actuator controller 187 over a common serial bus (e.g., a communication bus 224, FIG. 2) to accomplish the desired actuation. Each actuator controller 187 controls the position of an associated one of the actuators 108 (e.g., the actuator 108D shown) based on commands from the controller 186. In response to a command for a given one of the actuators 108, a corresponding actuator controller 187 generates, within the actuator assembly, motion commands for that one of the actuators 108. In various embodiments, a driver, e.g., the controller 186 or 187, is configured to provide the motion command(s) in response to a time-varying motion command and the motion-status signal(s). Signals from sensors (not shown) in one of the actuators 108 are sent to the associated actuator controller 187 in the actuator 108 assembly. The actuator controller 187 can use these sensor signals to verify the movement or position of the actuator 108. These sensor signals can include motion-status signals or feedback signals.

The controller 186 or the actuator controller 187 can perform various functions relating to the motion control described above. For example, the actuator controller 187 can include a motor driver, an actuator jam and short circuit control function, and an electronic clutch abuse control function. In addition, the actuator controller 187 can include communication and test (e.g., built-in test equipment) functionality.

In response to a single command received via the keypad 140 or another control surface, it may be necessary to move the actuators 108 in multiple stages, each with its own direction and motion profile. This is referred to herein as a "multi-segment motion." For example, one of the actuators 108 may need to move the corresponding component out of the way of a known obstruction, or from one mechanical channel or guide to another, before moving the component to its desired position. Moreover, a single command may require moving multiple components in unison or cooperation. For example, a command to configure the seat 101 for repose may require reclining the back support 114, raising the leg rest 110, and extending the foot rest 112. The controller 186 or 187 can adjust the motion profiles for these components based on their current positions so that each component arrives at the respective preset repose position simultaneously, rather than staggered in time.

Figure 2:
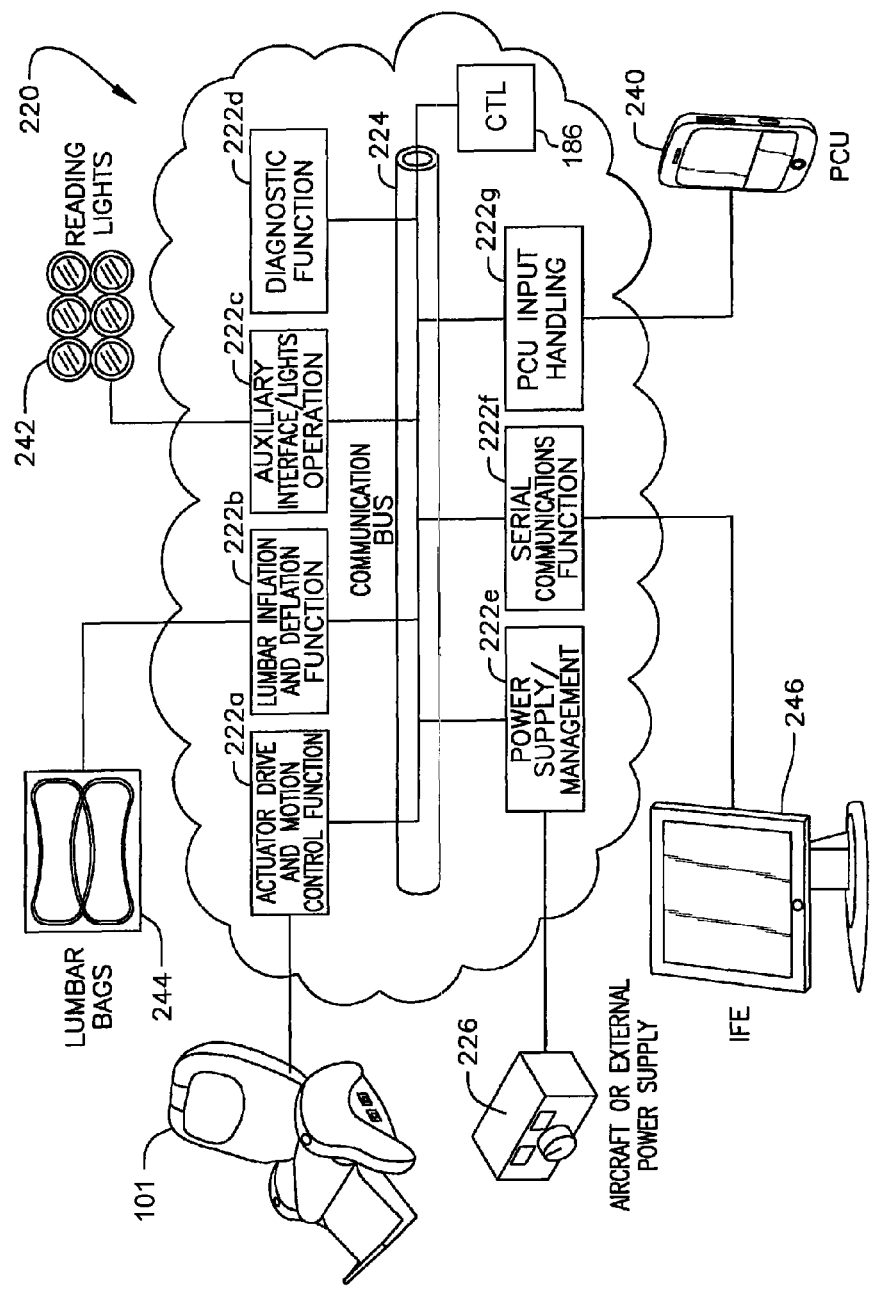
FIG. 2 is a schematic diagram of an exemplary seat actuation control system and related devices.

FIG. 2 shows a functional block diagram of a control system 220 for seat actuation according to various embodiments. The exemplary control system 220 uses, e.g., a network to control seat devices 109, e.g., actuators 108, associated with one or more seats 101, or movable components of the seats 101. The control system 220 includes a plurality of modules 222a-222g (collectively or individually referenced as 222) that are interconnected via a communication bus 224 for broadcasting status messages from one seat module associated with a seat 101, to one or more other seat modules on the same network. Each of the modules 222 can be a line replaceable unit ("LRU," i.e., a unit having common input/output interfaces for quick replacement on site with another unit) that is connected to an associated seat device 109, and can include hardware and software to autonomously and independently control its associated seat device 109. Additional modules can be added to the communication bus 224 to support enhanced or increased functionality. A particular seat device 109 can include an actuator 108 to move one or more moveable components of the seat such as, for example, a back support, leg rest, foot rest, head rest, seat pan, seat cushion, lumbar bladder, armrest, or seat frame. The controller 186 can be embodied as a separate device connected to the communication bus, as shown. Alternatively or additionally, controller(s) 186 or actuator controller(s) 187 can be embodied in actuator modules 222a, 222b or others of the modules 222. The controller(s) 186 and/or 187 can perform various functions in addition to the motion control functions described above. For example, the controller 186 or 187 can include a user interface (HIM), communication management, power management and test (e.g., built-in test equipment) functionality.

According to one embodiment, the modules 222 can include one or more actuator modules 222a, 222b, auxiliary interface/lighting modules 222c, diagnostic modules 222d, power supply (or power management) modules 222e, in-flight entertainment (IFE) (or serial communication) modules 222f, passenger control unit (PCU) modules 222g, and the like. Each seat 101 can include any number or combination of the above-noted modules. Each module interfaces with an associated seat device 109. The actuator modules 222a, 222b are configured to control and operate movable seat components via actuators 108. Each actuator module 222a, 222b is electrically powered and can include integrated electronics for power management, motion control, and position feedback. The actuator modules 222a, 222b can include respective actuators 108 or can be communicatively connected with external actuators 108.

The modules 222 communicate with one another via the communication bus 224. In various embodiments, the communication bus 224 is a serial digital communication bus that uses the Controller Area Network (CAN) standard. Accordingly, the communication bus 224 is referred to herein as the CAN bus. However, the communication bus 224 can be implemented based on various communications mechanisms such as Ethernet, RS-485, infrared, or radio-frequency communications system, as long as sufficient bandwidth and interconnection of multiple modules can be provided for operation of the control system 220 as described herein.

In various embodiments, multiple communication buses 224 can be used. For example, the controller 186 or 187 can communicate via discrete I/O with the passenger control unit (PCU) 240, via a first CAN bus with a suite control unit (SCU, not shown), e.g., a touchscreen, and via a second CAN bus (e.g., the communication bus 224) with the actuator modules 222a, 222b. In various examples, one or more of the actuators 108, FIG. 1, or modules 222 can be connected to one or more CAN buses or other communication buses 224. In various embodiments, communication bus(es) 224 can have a star topology (e.g., 10BASE-T Ethernet), a point-to-point topology (e.g., Token Ring), or a shared-medium topology (e.g., 10BASE-2 Ethernet).

The modules 222 can receive power from the communication bus 224 (e.g., via Power over Ethernet) or a separate power harness or bus (not shown). The power can be originally supplied from a power source 226, e.g., an external power source, and down-converted by the power supply module 222e for propagation from module to module through a power harness. For example, the power source 226 can include an aircraft supply providing 115 VAC single-phase power at 360 Hz-800 Hz. The power supply module 222e can turn on and off the power to the network, and can provide power at, e.g., 33 VDC, 28 VDC, and 12 VDC.

According to various embodiments, the modules 222 broadcast respective status information at configurable time intervals on the communication bus 224. According to an embodiment, the modules 222 are controlled by the controller 186, which issues commands to the modules 222 based on the received status information. For example, the controller 186 can send data via the communication bus 224 to actuator controllers 187 embodied in modules 222a, 222b. The data can include an indication of a desired motion, e.g., data coded to indicate "recline seatback to TTOL position" or "begin extending foot rest." In some of these examples, status information is received only by the controller 186. For example, the modules 222 can provide their status information directly to the controller 186 by unicast transmission via the communication bus 224.

According to another embodiment, upon receiving the broadcast status information, each module determines whether the status information is relevant, and if so, whether an action should be taken based on the status information. Each module then internally generates commands to take required action based on the status information. Thus, in this exemplary embodiment, each module is autonomous and independently controls the function of its component or seat device 109 with only the status information broadcast on the network by the other modules, without sending or receiving any commands to the other modules and without receiving commands from a central controller such as the controller 186. Instead, all processing and computations relevant to actuating a component or seat device 109 are distributed among all the seat modules 222 and performed internally by the modules 222 themselves. For example, in response to user selections on the PCU 240, the module 222g can transmit data including indications of a desired motion to modules 222a or 222b or actuator controllers 187 embodied therein. In another example, when an actuator controller 187 embodied in module 222a or 222b detects and obstruction, the corresponding module 222a, 222b can transmit status information on the communication bus 224 indicating that an obstruction was detected. Modules 222f, 222g can then cause a visual indication of the obstruction to be displayed to a user via the IFE 246 or the PCU 240, respectively.

The PCU module 222g can interface with one or more passenger control units 240 that can include keypad switches for receiving passenger input. The PCU module 222g can provide commands to modules 222a-222g, or can provide input to the controller 186 or 187. The lighting module 222c can operate one or more lights 242 such as reading lights, auxiliary/mood lights, foot well light, dome light, floor light, desk light, mini bar light, and TTOL indicator light, or other auxiliary devices. The lights 242 can be operated and dimmed, e.g., by pulse-width modulation (PWM) of a 28 VDC power supply for each light or group of lights, or by commands sent over the communication bus 224 to intelligent lights 242. The lumbar actuator module 222b provides back support to an occupant and can include a lumbar pump, pneumatic manifolds, solenoid valves, and electronics, which inflate and deflate lumbar bags 244. In an example, the IFE module 222f can include or communicate with an IFE display 246 with touch-screen capability for displaying movies, games or other visual and/or interactive entertainment to a passenger. In another example, in-flight entertainment and the IFE display 246 can be handled by a separate subsystem not connected to the communication bus 224. For example, the IFE subsystem can communicate directly with the controller 186 via an RS-485 or other point-to-point link.

The diagnostic module 222d can provide service personnel access to diagnostic information for the entire system. The exemplary diagnostic module 222d monitors the network traffic, and displays real time information about current status of the seat (which can be used to diagnose problems on the seat). The exemplary diagnostic module 222d also displays a list (with timestamps) of error conditions that have occurred recently as well as a detailed history of critical errors that have occurred over the lifetime of the seat. Alternatively, diagnostic functions can be performed within each module 222 and communicated to the controller 186 via the communication bus 224. In various embodiments, the controller 186 performs additional diagnostics and logs detected faults into a nonvolatile memory, e.g., Flash memory or other nonvolatile storage device 843, FIG. 8.

The control system 220 can control more than one seat 101, with each seat having more than one module. The modules of the control system 220 can, either independently and autonomously, or under control of the controller 186 or 187, can: provide actuation and control of their associated movable seat components; synchronize transitions of component(s) from a current position to any preset position defined by the occupant, such as TTOL, dine, lounge, or sleep/bed position; provide obstruction avoidance through continuous monitoring of present actuator positions and comparison of these positions with predefined forbidden zones; control power delivery to IFE equipment such as occupant-provided devices (e.g. portable audio/video devices) and other occupant related accessories; or provide built-in test capability by, for example, continuous monitoring of hardware and software used for the seat. Each module can control more than one seat device 109. For example, the PCU module 222g can support two PCUs 240, such that each PCU 240 functions in the network as unique module and can broadcast separate status information. In another example, an actuator for a privacy screen can be controlled by two different seats.

Figure 3:
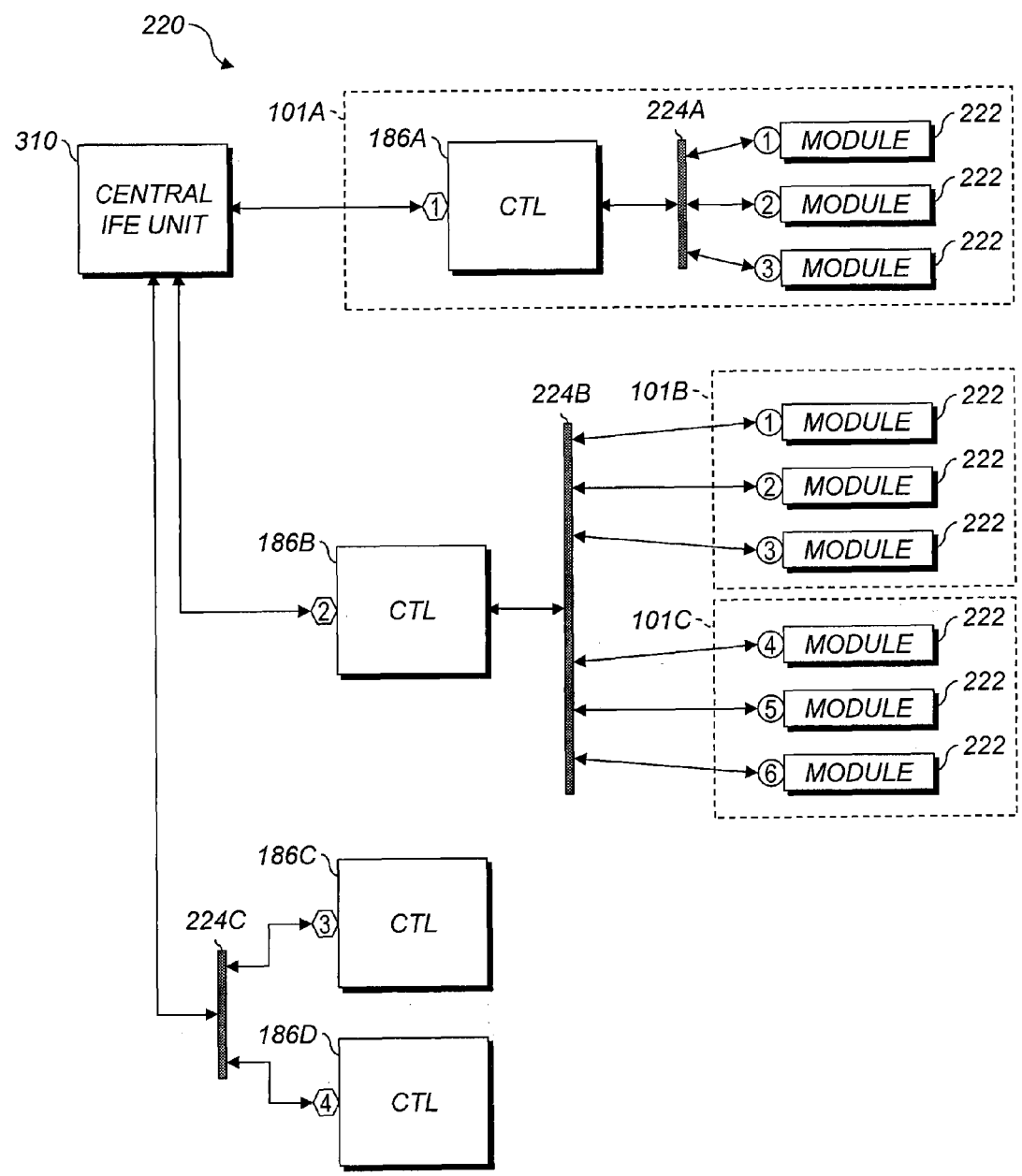
FIG. 3 is a schematic diagram of a plurality of aircraft seats with each seat including a plurality of control modules according to various embodiments.

FIG. 3 shows a schematic diagram of the control system 220 for seat actuation having multiple seats. In the example of FIG. 3, the control system 220 includes seats 101A, 101B, 101C, and each seat includes three modules 222. However, any number of seats 101 having any number of modules 222 can be included in the control system 220. The control system 220 can communicate with a central in-flight entertainment (IFE) unit 310 or with other devices or subsystems of a vehicle, e.g., an aircraft. Each module 222 can include or embody an actuator controller 187, FIG. 1. The modules 222 are connected to corresponding controllers 186 via communications buses 224. Each module 222 can have a network address, represented as a circled digit. Each controller 186 can have a network address, represented by a digit in a hexagon. Network addresses can include, e.g., CAN bus message identifiers that controllers 186 or modules 222 are configured to recognize; RS-485 device identifiers; Ethernet MAC addresses; or IP addresses. In this discussion, network address x is denoted "#x".

In an exemplary configuration, each seat 101 has its own controller 186 and its own modules 222. For example, seat 101A includes controller 186A (#1) connected via the communication bus 224A to modules 222 #1, #2, #3. Each controller 186 can be connected to the central IFE unit 310 via a point-to-point link, e.g., an RS-485 link. Alternatively, a plurality of controller(s) 186C (#3), 186D (#4) can be connected to the central IFE unit 310 via a communication bus 224C.

In another exemplary configuration, each pair or plurality of seats 101 can have a controller 186 connected to the modules 222 of each of those seats 101. In the example shown, controller 186B (#2) is connected via communication bus 224B to modules 222 #1, #2, #3 of seat 101B, and to modules 222 #4, #5, and #6 of seat 101C. In this example, each module 222 connected to communication bus 224B has a unique network address.

Also in this example, modules 222 connected to different communication buses 224 can share network IDs without ambiguity, since the network ID of the controller 186 can be used to differentiate the communication buses 224. The network address of a module 222 can therefore be specific to the function of the module 222, not its location. Here, modules 222 in seats 101A, 101B both have network addresses #1, #2, #3. For example, the lumbar module 222b can have network address #3 in both seat 101A and seat 101B.

Figure 4:
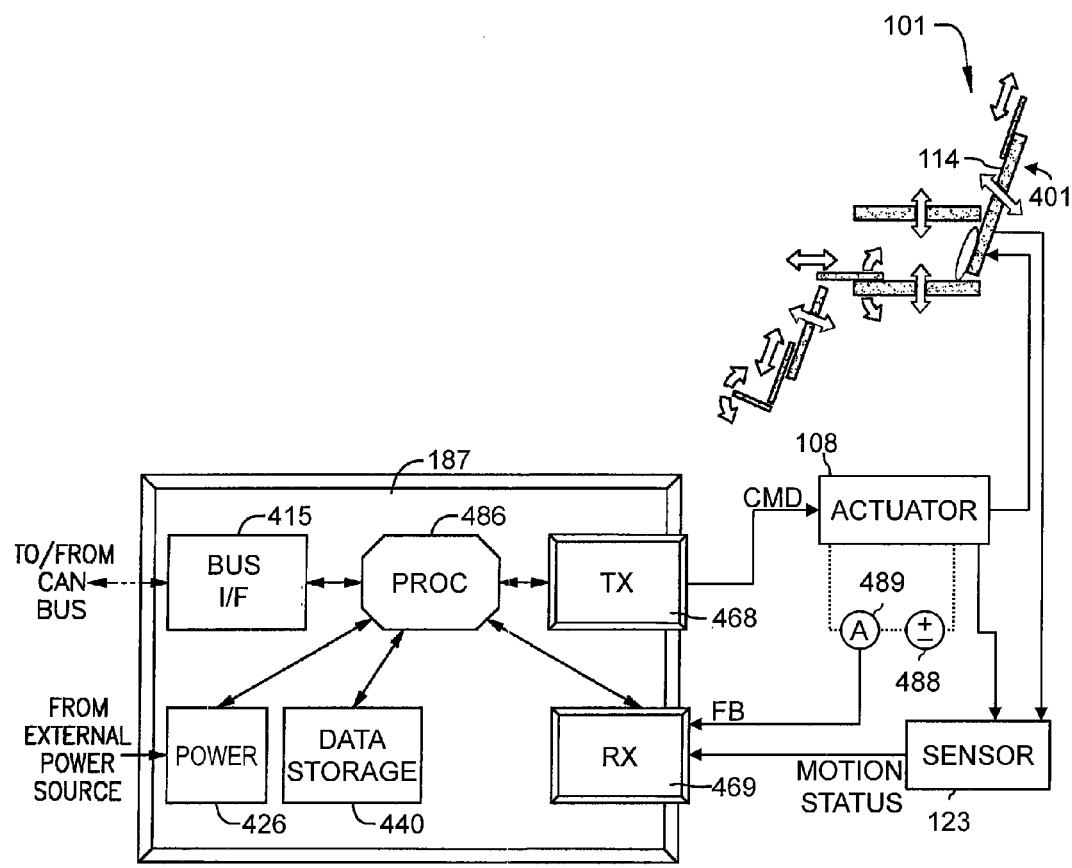
FIG. 4 is a schematic diagram of an exemplary control module configured to perform dynamic force monitoring, and related devices, according to various embodiments.

FIG. 4 shows an example of a control system for the powered seat assembly 101 ("seat") of a vehicle, e.g., an aircraft. The actuator controller 187 is configured to detect obstructions by a technique referred to herein as dynamic force monitoring ("DFM"). In various aspects, the functions of the actuator controller 187 discussed below can be executed on controller 186, FIG. 1. As discussed above, the seat 101 includes at least one component 401 that is movable over a range of positions; exemplary movements of components 401 are shown by open arrows. The seat 101 also includes one of the actuators 108 responsive to a time-varying motion command to move the at least one component 401 (in this example, a back support 114 adjustable for tilt angle). The actuator controller 187 is responsive to a feedback signal of the actuator 108, as described below. DFM can be performed for each actuator independently. For example, if a passenger is kneeling on the seat, leaning on the seatback, and looking towards the rear of the aircraft, the back support will be heavily loaded but the thigh rest will be substantially unloaded. Performing DFM independently for the back support and the thigh rest advantageously permits detecting obstructions on either actuator should the passenger move the seat while in such a position.

The actuator controller 187 can include a bus interface 415 that facilitates communication between the actuator controller 187 and the CAN bus or other communication bus 224, FIG. 3. A processor 486 is connected to the bus interface 415 in order to, e.g., process status information received from the modules 222, perform various computations that may be required in order to control the module's corresponding seat device 109 (e.g., actuator 108), manage the operations of other devices of the module, and prepare status information to be transmitted to others of the modules 222 with the bus interface 415 through the communication bus 224. Power is provided to the actuator controller 187 and the processor 486 via a power unit 426, which can receive power from the power source 226, FIG. 2. The processor 486 can be or include any type of controller or processor that can provide the functions described herein. In some of the disclosed embodiments, the processor 486 is an ARM microprocessor or a COLDFIRE processor, e.g., implemented in an ALTERA CYCLONE field-programmable gate array (FPGA) or an ASIC. Other examples of the processor 486 are discussed below with reference to FIG. 8. The processor 486 communicates with a data storage system 440, e.g., an internal or external memory, to load software and data useful for various operations and computations of the processor 486. The processor 486 can further store and retrieve additional data generated by the processor 486 to and from the data storage system 440. Further details of these operations are discussed below with reference to FIG. 8.

The control system includes a receiver 469 ("RX") for receiving the feedback signal of the actuator 108, e.g., from an ammeter 489 or another sensor unit. A transmitter 468 ("TX") transmits the time-varying motion command ("CMD") to the actuator 108. A controller, in this instance the processor 486, is connected to the receiver 469 and the transmitter 468. The processor 486 is configured to determine a feedback-signal acceptance range using the feedback signal during an acceleration phase of the time-varying motion command, and to terminate motion if the feedback signal departs the determined feedback-signal acceptance range during a steady-state phase of the time-varying motion command. This and other functions of the processor 486 are discussed below with reference to FIGS. 5-7.

In the embodiment shown, the actuator 108 is powered by a supply 488, e.g., an AC or DC power supply or a tap into the power supplied by the power source 226, FIG. 2. The ammeter 489 measures drive current drawn from the supply 488 by the actuator 108 and provides data of the drive current as the feedback signal of the actuator 108. The current path through the supply 488 and the ammeter 489 is shown dotted for clarity only. The ammeter 489 can include a Hall-effect sensor, resistive sensor, or other current-to-voltage transducer, e.g., coupled to an analog-to-digital converter (ADC). A 10-bit ADC can be used in the milliamp range to provide measurement of currents between ~0 A and ~15.379 A.

The feedback signal is provided to the processor 486, e.g., directly or via the receiver 469 (as shown). Monitoring drive current advantageously permits detecting obstructions. The drive current increases when an obstruction is encountered, e.g., because the actuator 108 increases the force exerted to try to overcome the obstruction, or because a motor (e.g., a DC motor) in the actuator 108 is slowing down, reducing back emf and thus impedance and thereby permitting higher current flow. Other signals can be used as feedback signals in various embodiments, e.g., signals of the time-varying motion command or motion-status signals (discussed below). A voltage drop across a motor or other active element in the actuator 108 can also be monitored to provide the feedback signal.

In various exemplary embodiments, the processor 486 is configured to transmit the time-varying motion command, including an acceleration signal, via the transmitter 468. The acceleration signal can, e.g., direct an increase in speed of the actuator 108 speed over a selected period of time. During transmission of the acceleration signal, the processor 486 monitors the feedback signal via the receiver 469 and selects a value of the feedback signal corresponding to a reference state of the motion command. The processor 486 then determines the initial feedback-signal acceptance range using the selected value of the feedback signal. The foregoing operation is discussed in greater detail below with reference to steps 510 through 530, FIG. 5. After transmission of the acceleration signal, the processor 486 transmits the time-varying motion command including a steady-state motion signal via the transmitter 468. The steady-state motion signal can, e.g., direct the actuator 108 to maintain speed. The steady-state phase can include accelerations or decelerations, but commanded motor speed remains nonzero during the steady-state phase. During transmission of the steady-state motion signal, the processor 486 monitors the feedback signal via the receiver 469 and terminates the motion by automatically terminating transmission of the steady-state motion signal if the monitored feedback signal departs the determined feedback-signal acceptance range. The foregoing operation is discussed in greater detail below with reference to steps 540 through 560, FIG. 5.

In an exemplary embodiment, the control system further includes an interface, e.g., the bus interface 415, for receiving an indication of a desired motion. The indication can be, e.g., a data packet or flag signifying that the user has commanded a change in seat position via the PCU 240, FIG. 2. The interface can include, e.g., one or more of a keypad, a pushbutton, a touchscreen, and a wireless interface, in any combination. The controller, e.g., the processor 486, is responsive to the received indication to determine the feedback-signal acceptance range. In an example, if the desired motion increases in speed, an upper limit of the feedback-signal acceptance range can increase in magnitude to take into account the higher currents required to drive the actuator 108 at the increased speed in the absence of obstructions. The controller can also provide the motion command(s), e.g., the time varying motion command(s), in response to the received indication.

Still referring to FIG. 4, there is shown an example of structures in the powered seat assembly 101 ("seat") and components thereof. Seat components, the actuators 108, and the actuator controller 187 are discussed above with reference to FIG. 1. A sensor unit, e.g., the ammeter 489, is configured to monitor one or more time-varying feedback signal(s) of the actuator(s), e.g., drive current value(s). A controller (e.g., the actuator controller 187 or the processor 486) is configured to determine respective feedback-signal acceptance range(s) for at least one of the actuator(s) using value(s) of the respective feedback signal(s) monitored during an acceleration phase of motion of the respective actuator(s), and to terminate motion of the respective actuator(s) if the respective feedback signal(s) depart the respective feedback-signal acceptance range(s) during a steady-state phase of motion of the respective actuator(s). The operation of the controller is further discussed below with reference to FIG. 5.

In various examples, the feedback signal(s) from the sensor unit include one or more current signal(s) of the actuator(s). In various examples, each of the one or more actuator(s) 108 includes a brushed direct-current (BDC) or brushless direct-current (BLDC) motor. In various examples, the one or more actuator(s) includes the respective actuators 108A, 108C, 108D for each of the back support 114, the seat pan 116, and the leg rest 110, respectively. Each of the respective actuators 108A, 108C, 108D (or others, e.g., shown in FIG. 1) can be responsive to a respective one of the motion command(s) and can be configured to provide respective ones of the motion-status signal(s), e.g., current signal(s). Each of the respective actuators 108A, 108C, 108D can be connected to a respective ammeter 489, or connected via a time-division multiplexer to a single ammeter 489, or another sensor unit can monitor multiple actuators 108. Each of the motion command(s) can include one or more commanded velocities of the one or more actuator(s).

In various embodiments, at least one of the actuator(s) 108 is configured to move a respective component of the seat over a range of positions divided into a plurality of zones having respective values of a parameter. Zones of motion of the actuator 108 are discussed below with reference to FIGS. 5 and 6. The actuator controller 187 is configured to determining the feedback-signal acceptance range by determining one of the zones in which the respective component is located and determining the feedback-signal acceptance range using the respective parameter value of the determined one of the zones. Examples of stored parameters include the limits of motion defining the zones, typical currents for actuator motion "empty," i.e., when no passenger is in contact with the seat 101 or a portion thereof, typical percentages of overcurrent that suggest obstructions are present; slope limits or thresholds as described below with reference to FIG. 5; and slope limits corresponding to stalling of the actuator 108. In various aspects, the controller 186 or 187 includes a nonvolatile memory in the data storage system 440 configured to store the parameter(s) of at least one zone of motion of at least one of the actuator(s) 108. The nonvolatile memory can include nonvolatile storage device 843, FIG. 8, e.g., a disk or Flash memory. The processor 486 is connected to the memory, e.g., the data storage system 440, and is configured to determine the respective feedback-signal acceptance range(s) using ones of the stored parameter(s) corresponding to the respective actuator(s). The exemplary parameters above or other parameter(s) can be stored in any number or combination.

Figure 5:
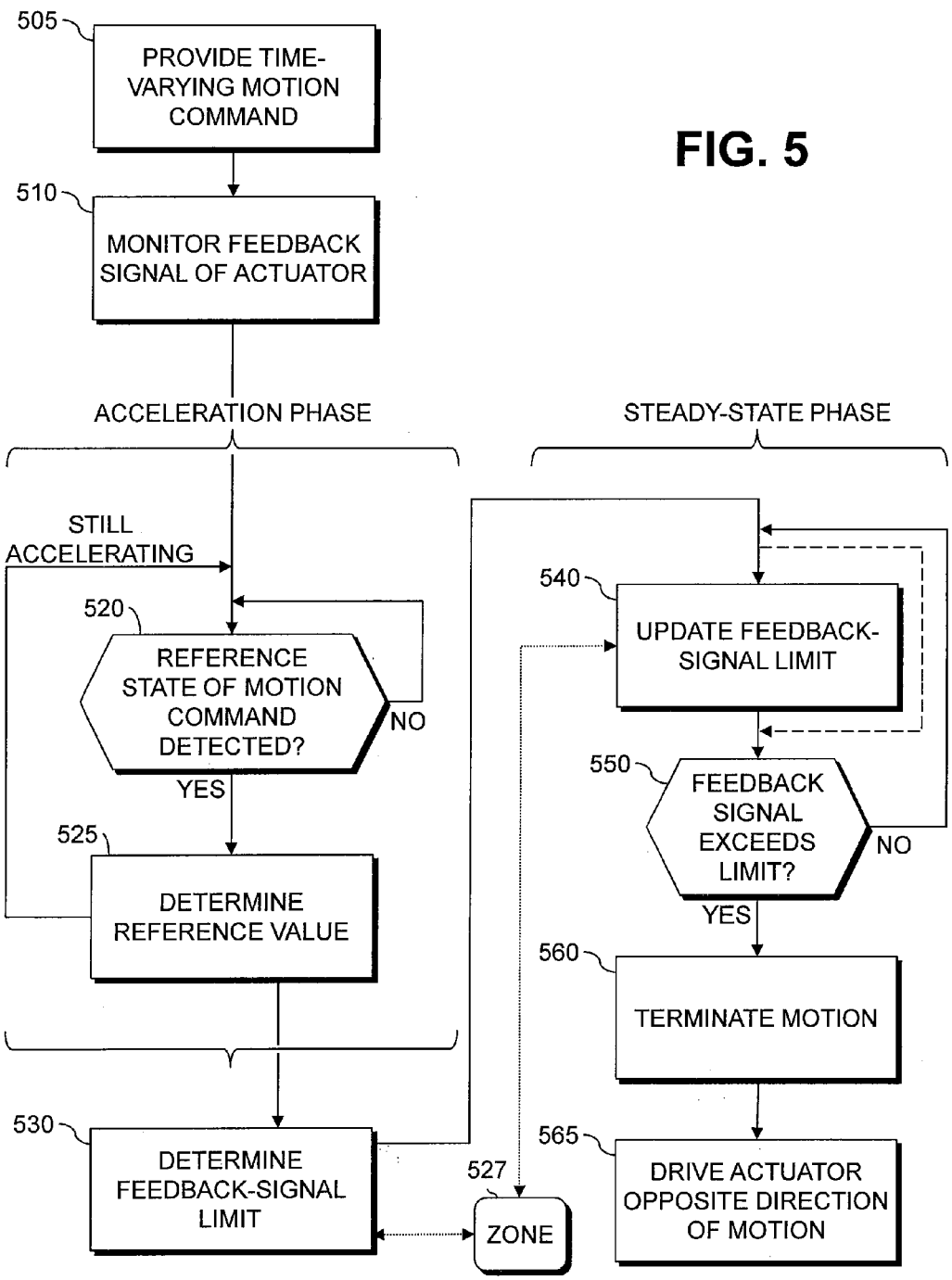
FIG. 5 is a flowchart illustrating exemplary methods of controlling a powered aircraft seat during a motion.

FIG. 5 shows a flowchart illustrating an exemplary method of controlling motion of movable components of a powered seat. For purposes of interpretation, rounded rectangles represent data items and sharp-corner rectangles represent steps or processes. The steps can be performed in any order except when otherwise specified, or when data from an earlier step is used in a later step. In at least one example, processing begins with step 505, or with step 510. For clarity of explanation, reference is herein made to various components shown in FIGS. 1-4 that can carry out or participate in the steps of the exemplary method. It should be noted, however, that other components can be used; that is, exemplary method(s) shown in FIG. 5 are not limited to being carried out by the identified components. In various examples, steps 520 and 525 are conducted during an acceleration phase of the motion, and steps 550, 560, 565 are conducted during a steady-state phase of the motion. In other examples, step 525 is conducted during the steady-state phase of the motion, or between the acceleration phase and the steady-state phase. Step 530 can be conducted during either phase of the motion, or between phases. Various methods described herein can be applied independently to each of a plurality of actuators, e.g., to detect an obstruction between the leg rest 110, FIG. 1, and a bulkhead. Various methods described herein can be applied to several actuators acting in concert, e.g., to detect an obstruction between the back support 114 and the seat pan 116, both FIG. 1, as the seat 101 moves from a reclining to an upright position.

Still referring to FIG. 5 and also referring back to FIG. 4, the seat 101 includes the actuator controller 187 (e.g., including the processor 486) responsive to a time-varying motion command. The seat 101 also includes the at least one actuator 108 for moving the component(s) 401 of the seat 101 over a range of positions. Examples of the components 401 are discussed above with reference to FIGS. 1-4. The actuator 108 can move the entire seat (e.g., sliding forwards and backwards) or only a portion (i.e., component) of the seat (e.g., adjusting the angle of the leg rest 110, FIG. 1). An exemplary time-varying motion command includes an acceleration phase, a steady-state phase, and a deceleration phase, in that order. In the steady-state phase, motion continues at a target velocity in the absence of commands to the contrary or obstructions. The motion command can follow a selected motion control profile. Exemplary motion control profiles include trapezoidal motion control profiles having three phases, S-curve motion control profiles having seven phases, and parabolic motion control profiles having one phase. A "phase" can be characterized, e.g., as a duration of constant slope over time of values of a controlled parameter, e.g., position, velocity, or acceleration.

In embodiments using step 505, the at least one actuator 108 is configured to provide a motion-status signal, as described above with reference to FIG. 4. The motion-status signal can include, e.g., encoder counts, or resistance of a position-sensing potentiometer. In step 505, actuator controller 187 receives an indication of a desired motion, e.g., via the bus interface 415, and automatically providing the time-varying motion command in response to the received command and the motion-status signal. In this way, the actuator controller 187 runs closed-loop, operating the actuator 108 based on the encoder signal or other motion-status signal therefrom. As discussed below, to detect present or potential obstructions, the controller can monitor the actuator current or other feedback signal while the motion command is applied.

In step 510, using the actuator controller 187, a feedback signal of the at least one actuator 108 is monitored during the motion of the seat 101, FIG. 4. The feedback signal of the actuator 108 can be monitored in various ways. In an example using a BDC or BLDC motor in the actuator 108, the feedback signal includes a drive current of the actuator 108, i.e., the magnitude of an electrical current drawn by the BLDC or BDC motor. This can be measured using the ammeter 489.

In another example using the actuator 108 including a motor controlled by a proportional control loop around motor velocity, the feedback signal can be the commanded motor drive output provided by the control loop. In either of these examples, if the motion of the actuator 108 or the seat component thereof is blocked, e.g., because luggage has become trapped in a pinch point, the feedback signal will increase in a relatively sudden or unexpected manner in an attempt to compensate for the reduced motor velocity occasioned by the increase in load at the obstruction. This increase can be indicative of an obstruction.

In decision step 520, during an acceleration phase of the motion of the component 401, it is automatically determined, e.g., by the processor 486, whether a reference state of the time-varying motion command has been detected. If the reference state has been detected, the next step is step 525. If not, the processor 486 continues to wait in decision step 520 until the reference state is detected.

In an example, the motion command includes a sequence of velocity command values. For example, the motion command can include a digital value representing a motor drive voltage for each update period, e.g., 2 ms, 20 ms, or 80 ms. Motor angular velocity is positively correlated with motor drive voltage in this example. The actuator controller 187 detects the reference state when the sequence of velocity command values exhibits a selected slope value. The slope value can be computed as the difference between two successive velocity command values. The successive velocity command values can be consecutive values, or samples separated by 1, 2, 3, 4, 5, or any other number of intervening samples. A sequence of velocity slope values can be determined using the sequence of velocity command values, e.g., by subtracting each element i of the velocity command value sequence from element i−1 thereof.

In an example, the reference state is detected when the sequence of velocity command values exhibits a peak slope value. The slope of the sequence of velocity command values corresponds to the requested acceleration, so a peak slope value corresponds to a peak requested acceleration, the point at which the most force is being applied by the motor to the load (F=ma). Selecting a current load corresponding to peak acceleration can reduce the probability of incorrectly detecting an unobstructed high-load condition as an obstruction. The peak slope value can be detected in a determined sequence of velocity slope values, e.g., by detecting a local maximum over a selected window of samples. The reference value of the feedback signal can be determined when or a selected time after the peak slope value is detected. In an example, a sequence of feedback signal values $f_n$ is provided corresponding to velocity slope values $m_n$, n=1, 2, . . . . If the peak value is detected at velocity slope value m, for some positive integer i, the reference value can be selected as $f_i$, $f_{i+1}$, or in general $f_{i+k}$ for any positive integer k.

In this and other examples, the feedback-signal acceptance range can extend up to, e.g., the higher of the reference value of the monitored feedback signal and a selected low-limit threshold. The feedback signal can be, e.g., a motor drive current. For high unobstructed loads, the acceptance range can be set using the current required to move the components 401 against those loads. For low unobstructed loads, the low-limit threshold is used. Embodiments using a low-limit threshold can have a reduced probability of detecting an obstruction when no obstruction is present, since a lower limit to the threshold corresponds to a certain amount of current that must be present to indicate an obstruction.

In step 525, a value of the monitored feedback signal corresponding to the detected reference state of the time-varying motion command is determined as a reference value using the actuator controller 187 (having the processor 486). The value can be, e.g., selected from a lookup table or table of historical data, or computed. In an example, the reference value is a measured value of the feedback signal during a time period in which the reference state of the time-varying motion signal is detected, e.g., once the motion signal has stabilized at the value to be used during a steady-state phase of the motion. Determining the reference value during the acceleration phase advantageously permits detecting a load, e.g., the weight of a passenger in the seat, without requiring separate measurement devices or measurement sequences.

In step 530, the actuator controller 187 automatically determines a feedback-signal acceptance range using the reference value of the monitored feedback signal. The selected reference value is the value corresponding to the reference state of the time-varying motion command. The feedback-signal acceptance range can be used to determine when an obstruction is present. An example of a feedback-signal acceptance range is the range from zero (or negative infinity) to a positive actuator current limit. Since the feedback-signal acceptance range is correlated with the reference value, the feedback-signal acceptance range varies with load, e.g., passenger weight. This permits automatically setting appropriate thresholds based on the load of a particular seat. In various aspects, the feedback-signal acceptance range includes upper and lower limits of acceptance, instead of or in addition to a threshold. Step 530 can be followed by step 540 or decision step 550. The flowchart path from step 530 to step 550 is shown dashed only for visual clarity and without limitation.

Various embodiments use "zone" control techniques. The actuator 108 can be operated with different parameters in different zones (portions) of its travel. Specifically, the range of positions over which the seat component 401 driven by the actuator 108 can move can be divided into a plurality of zones having respective values of a parameter. Examples of parameters include drive current, voltage, frequency, and waveform. Varying parameters by zone permits adjusting the behavior of the component 401 driven by the actuator.

For example, the actuator 108D, which controls the leg rest 110, both FIG. 1, can be operated in a current-limited (reduced-torque) mode when the leg rest 110 is nearly vertical, and in a higher-current (higher-torque) mode when the leg rest 110 is not nearly vertical. Actuators can have one zone or more than one zone, e.g., 5 zones. The zones can be configured by software on the controller 186 and sent to each actuator controller 187 via communication bus 224. Different zones or sets of zones can be used for travel in each direction. Discussions herein of zone-specific processes or data also apply to systems that use only one zone, i.e., do not change parameters over the travel of the actuator 108.

In these embodiments, step 530 includes automatically determining one of the zones in which the at least one component 401 is located. The determined zone can be stored in a memory or memory cell represented graphically as a zone 527. Step 530 further includes determining the feedback-signal acceptance range using the respective parameter value of the determined zone 527. An example is discussed below with reference to FIG. 6.

In step 540, in various embodiments, during the steady-state phase of the motion, the determined feedback-signal acceptance range is automatically updated. The updates can be based on, e.g., the motion command or the monitored feedback signal, or both, or other signals or conditions. Step 540 can include performing respective updates based on one or more signals or conditions, e.g., an update based on the motion command and a separate update based on the feedback signal. Alternatively, updates can be made when both the motion command and the monitored feedback signal concurrently or nearly concurrently trigger updates. Updates in step 540 can be performed as described above with reference to one or more of steps 510, 520, 525, and 530. Step 540 can be followed by decision step 550.

In various embodiments, step 540 includes automatically updating the feedback-signal acceptance range based on the motion command during the steady-state phase of the motion. In an example, the motion command includes a sequence of velocity command values. The updating of the determined feedback-signal acceptance range is performed when the sequence of velocity command values exhibits a slope having a magnitude greater than a selected velocity-slope-magnitude threshold, as discussed above. Such changes in velocity can correspond to transitions between zones, e.g., as described below with reference to FIG. 6. If the commanded velocity increases significantly, the value of the feedback signal is likely to also increase significantly. Increasing the feedback-signal acceptance range when the commanded velocity increases advantageously permits detecting genuine obstructions without considering the expected increase in the feedback signal to be indicative of an obstruction. Decreasing the feedback-signal acceptance range when the commanded velocity decreases advantageously maintains the sensitivity of the system to obstructions.

As with step 530, the controller can update the feedback-signal acceptance range in step 540 using a parameter corresponding to the determined zone 527. Step 540 can also include determining in which zone the component 401 is located and updating the memory of the zone 527 accordingly. An example of zone-based parameters is discussed below with reference to FIG. 6.

In various embodiments, step 540 includes automatically updating the determined feedback-signal acceptance range based on the monitored feedback signal. In an example, the monitored feedback signal includes a sequence of drive current values. The updating of the determined feedback-signal acceptance range is performed when the sequence of drive current values exhibits a slope having a magnitude less than a selected current-slope-magnitude threshold. Such slopes can correspond to gradual changes in load or velocity, such as can occur at the transitions between zones. Such gradual changes can also relate to transitions between areas of the actuator that have more or less lubricant, or more or less surface roughness owing to normal wear. As discussed above with reference to velocity-command slopes, the feedback-signal slope value can be computed as the difference between two successive feedback-signal values. The successive feedback-signal values can be consecutive values, or samples separated by 1, 2, 3, 4, 5, or any other number of intervening samples.

Updating based on the feedback signal can advantageously permit the actuator controller 187 to recognize gradual changes in current as normal and also to detect abrupt changes in current as possibly indicative of obstructions. Such gradual changes in current can result from load dynamics or changes in speed. For example, the force required to oppose gravity while raising the leg rest 110, FIG. 1, can increase as the leg rest 110 nears the horizontal and bears a greater proportion of the weight of the passenger's legs. If the changes in current due to that increase in required force are smaller in magnitude than the selected current-slope-magnitude threshold, the feedback-signal acceptance range can gradually increase to permit the increase in force with reduced probability of mistakenly detecting an obstruction, and still retain the ability to detect genuine obstructions. Likewise, as the leg rest 110 is lowered and the required current gradually decreases, the feedback-signal acceptance range can gradually decrease to reduce the probability of mistakenly failing to detect an obstruction.

In various embodiments, during the steady-state phase, a runtime value of the monitored feedback signal is determined. The updating of the determined feedback-signal acceptance range, e.g., in step 540, includes updating an upper limit of that acceptance range to the higher of the runtime value of the monitored feedback signal and a selected low-limit threshold. In this way, updates to the feedback-signal acceptance range preserve a margin of current in which normal operation can take place, reducing the probability of incorrectly detecting an obstruction when none is present. The runtime value of the monitored feedback signal can be used with updates based on the motion command, the monitored feedback signal, both, or other factor(s).

In other embodiments, step 510 of monitoring the feedback signal includes determining a sequence of drive-current slope values using the sequence of drive current values, as noted above, and detecting an excursion in the sequence of velocity slope values beyond a selected steady-current range. Step 540 of updating the determined feedback-signal acceptance range includes determining a value of the feedback signal a selected time (e.g., a selected number of cycles or a selected number of milliseconds) after the excursion is detected and updating an upper limit of that range to the higher of the determined value of the feedback signal and a selected low-limit threshold, as noted above. This advantageously debounces short-duration spikes or dips in slope.

In decision step 550, during a steady-state phase of the motion, it is determined, e.g., by the actuator controller 187, whether the monitored feedback signal has departed or is departing the determined feedback-signal acceptance range. If so, the motion of the component 401 of the seat 101 is automatically terminated (step 560), e.g., by the actuator controller 187. In an example, the feedback-signal acceptance range includes an upper limit, and the monitored feedback signal departs the feedback-signal acceptance range whenever above the upper limit. Departure can also be determined by other comparisons or conditional tests appropriate to the form of the feedback-signal acceptance range.

In various aspects, step 560 is followed by step 565 of, after terminating the motion, performing retrograde motion. Performing retrograde motion includes automatically driving the actuator 108 in a direction that is opposite a direction of the motion, which can remove the obstruction and relieve pressure on the pinched object. Retrograde motion can include driving the actuator 108 to move the component 401 a selected distance from the point at which the obstruction was detected. At the end of retrograde motion, the actuator 108 can be left with a speed of zero, and with a brake applied if present.

Figure 6:
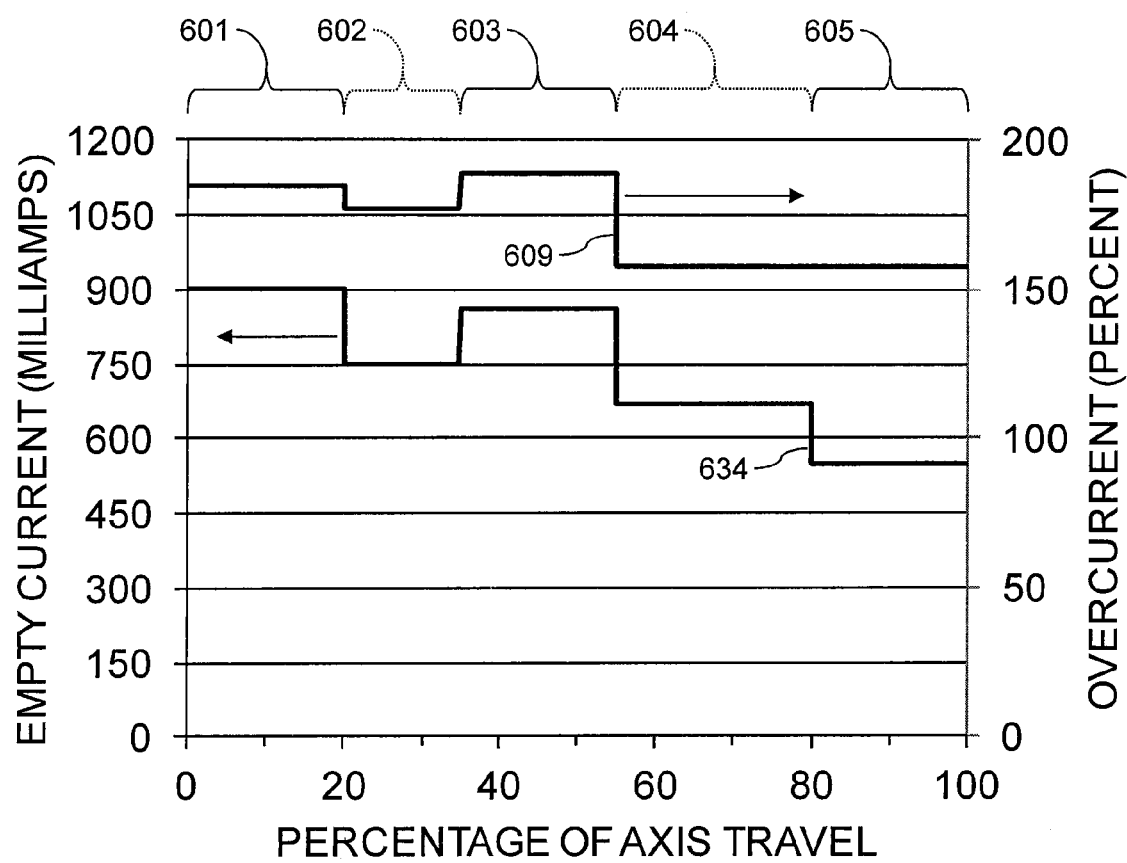
FIG. 6 is a graph showing an example of parameters for different zones of a motion.

FIG. 6 shows an example of zones 601, 602, 603, 604, 605, referred to above with reference to step 530, FIG. 5. These are discussed in the context of FIG. 1. Dividing the range of positions of each component into zones, e.g., five zones, permits customizing computations for the known differences in mechanics and for the maximum forces allowed. Some zones may not have pinch points and therefore can be operated at a higher allowable force trip point. These adjustable parameters are set and stored in the controller 186 or 187, e.g., in the data storage system 440, FIG. 4, and can be downloaded to each individual actuator controller 187, FIG. 1, at power up.

Referring back to FIG. 1, the powered seat assembly 102 has a seat back 194 that can tip backwards and forwards around a rotational axis 195. Although the seat back 194 is moving in two dimensions, its motion can be effectively characterized by a single value of rotation around the rotational axis 195. A coordinate frame is shown in dashed lines centered on the rotational axis 195. Rotations θ are shown counter-clockwise from the 12 o'clock position of this coordinate frame. In this example, the range of positions through which the seat back 194 can travel extends for values of θ between 0° (vertical) and 90° (horizontal). The motion of the seat back 194 can be characterized as an arc traveled by a reference point 191 around the rotational axis 195, e.g., as indicated by the arcuate arrow through the reference point 191.

Referring to FIG. 6, there is shown is a graph of empty current (curve 634; mA) and overcurrent (curve 609; percent) as a function of axis travel (percent) over the zones 601, 602, 603, 604, 605. The zones 602 and 604 are shown dotted only for visual clarity. "Empty current" is the required current on an actuator 108 (not shown) required to move the seat back 194 when no passenger is sitting in the powered seat assembly 102, both FIG. 1. "Overcurrent" is the amount of current above which an obstruction will be detected relative to the normal current. These are discussed herein with reference to FIGS. 4 and 7.

The motion of the actuator 108 (not shown) that moves the seat back 194 can be divided into zones 601-605 according to percentage of travel, e.g., between an upright position and a reclined position. The percentage of travel may or may not be linearly correlated with angle θ. In an example of nonlinear correlation, the actuator 108 drives the input link of a four-bar linkage (e.g., a crank-rocker or double rocker) and the output link of the linkage moves the seat back 194. In this example, the first zone 601 covers the interval [0%, 19%), the second zone 602 covers the interval [20%, 35%), the third zone 603 covers the interval [35%, 55%), the fourth zone 604 covers the interval [55%, 80%), and the fifth zone 605 covers the interval [80%, 100%].

As shown, each zone has its own empty current value, and the empty current increases or decreases as axis position changes. In an example, the seat back 194 is maintained in an upright position by a spring such as a spiral torsion spring (not shown in FIG. 1). The force exerted by a spiral torsion spring is proportional to the angle of twist of the spring (e.g., θ in FIG. 1). Reclining the seat back 194 increases θ and twists the spring, so the farther the seat back 194 reclines (the more θ increases), the more force is required to overcome the restoring force of the spring. The increase in required force translates to an increase in required current. Empty current increases for corresponding reasons in exemplary embodiments using helical coil springs or other types of restoring devices in place of the spiral torsion strings. In another example, a linear actuator moves the seat back 194, e.g., via a pivoting, sliding link. Changes in the lever distance change the force required, and thus change the empty current. The empty current can either increase or decrease due to changes in lever distance over the full travel of the axis.

Empty current is simply an example of a parameter of each zone. Other examples of parameters can include separate empty currents for forward and reverse directions; overcurrent percentages (overall, forward, or reverse) indicating the amount of current above which an obstruction will be detected relative to the normal current; slope trigger limits and slope update limits used in updating the feedback-signal limits; and stall currents or slopes used to detect stalled actuators.

In view of the foregoing, various aspects provide control systems for powered seats, and ways of controlling powered seats. A technical effect is to alter the motion of a powered seat based on the environment around the seat, e.g., by halting or reversing motion when an obstruction is detected. Process(es) shown in FIG. 5 advantageously improve the capability of the processor 486 to discriminate between normal operations and obstructions within the dynamic conditions of user weight and mechanical variations. In various embodiments, a dynamic learning approach is used, as described above with reference to steps 510-530, to determine characteristics of the motion axis, which represents the aggregate behavior of the actuator 108, the driven component, and whatever load is placed on that component. Learned axis characteristics are compared to configuration values, e.g., stored in percentages instead of absolute current values (e.g., in decision step 550). Motor current, the rate of motor current change (current slope), commanded velocity, and the rate of commanded-velocity change (command slope) are used to evaluate the axis operation.

Referring back to FIG. 4, in an example, the processor 486 in the actuator controller 187 is configured to control the exemplary actuator 108 (or multiple ones of the actuators 108, with control as described herein for each). Various embodiments include each of the features described for this example, or only some of the features.

The processor 486 runs (i.e., executes computer program instructions to carry out computations for) a digital control loop at regular intervals ("ticks"), e.g., every 2 ms. The digital control loop processes motion-status signal(s) received from the sensor 123 and produces motion command(s) for the actuator 108. The digital control loop can include power control and ramp control functions. The digital control loop can also include an overcurrent detection function to stop operation of the actuator 108, and possibly execute retrograde motion, if the current detected by the ammeter 489 exceeds a selected global limit or a selected per-zone limit. The processor 486 can also run calibration, communications, event logging, or error handling programs sequentially or concurrently. In parallel with the digital control loop, the processor 486 runs a dynamic force monitoring (DFM) process as described above with reference to FIG. 5. Each of the one or more zone(s) of motion in this example is associated with parameters defining expected empty-seat motor current values, for both directions of motion, percentages used to determine overcurrent conditions, for both directions of motion, and a current slope magnitude indicative of a rapid change in current that may be due to an obstruction.

In this example, the feedback signal value (e.g., motor current) is read and saved every tick (e.g., 2 ms). Motor current is inspected to check for obstructions every i ticks (i∈ ℕ ≥1, e.g., i=10), and the feedback-signal acceptance range (current threshold) is updated every m ticks (m∈ ℕ ≥1, e.g., m=40). The values i and m can be the same or different, e.g., i<m. At every tick, in this example, the feedback signal is added to two running totals. Every i ticks, the first running total is divided by i to produce an averaged feedback-signal value for testing, and then is reset. Averaging is optional (i=1 is valid) and is useful for reducing measurement or other noise in the feedback signal. Every m ticks, the second running total is added to the averaged current from the last m-tick period and is divided by m+1 to produce an averaged feedback-signal value for updating. The second running total is then reset. The feedback-signal values for updating from the last u periods (of m ticks each; u∈ ℕ >1, e.g., u=6) are recorded, e.g., in a circular buffer (rotary queue). This permits determining feedback-signal slopes. As noted above, feedback-signal slopes are used to determine when current is changing quickly enough that an obstruction may be present. Feedback-signal slopes can be determined as discussed above with reference to step 540.

Figure 7:
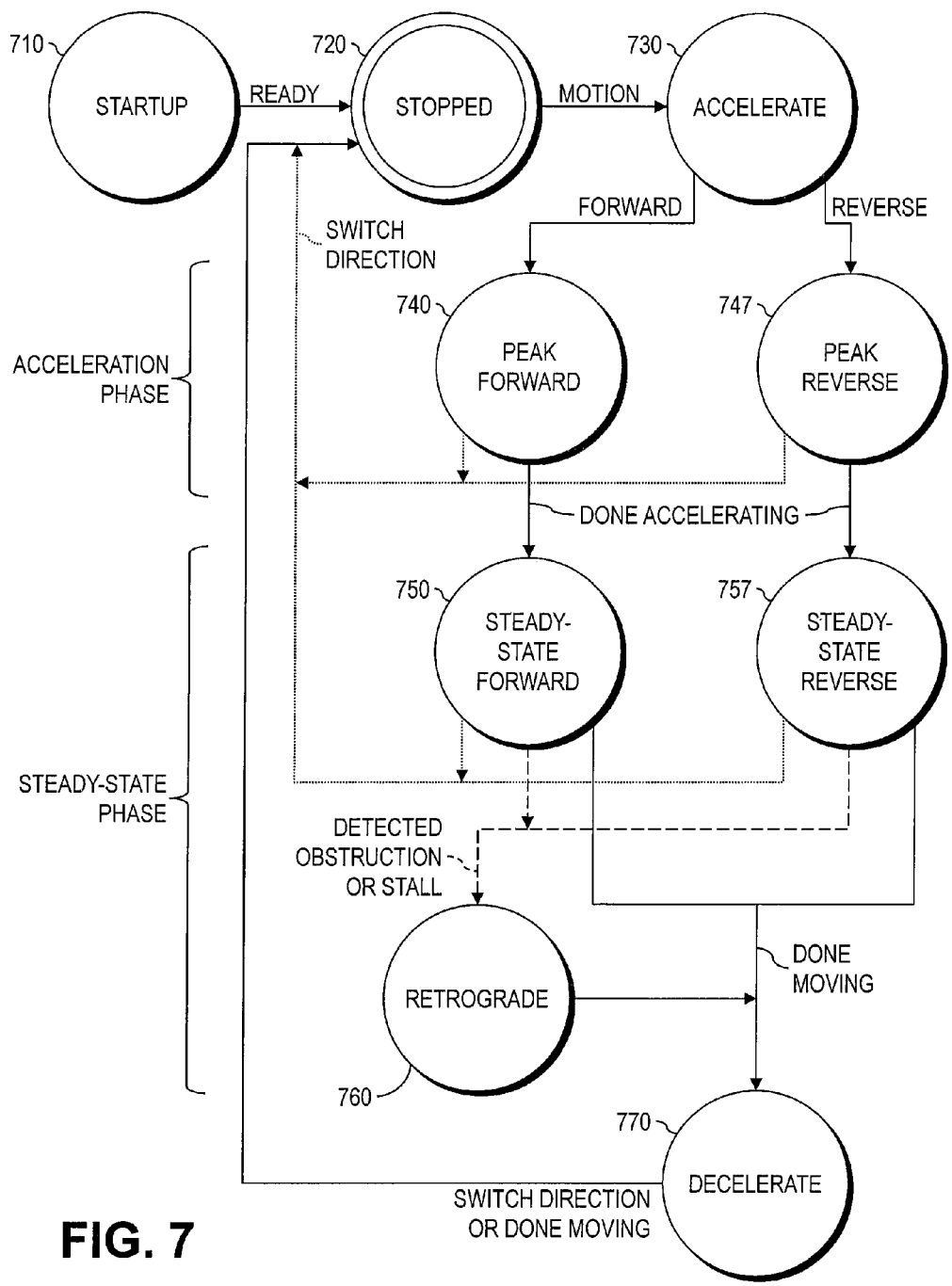
FIG. 7 is a diagrammatic representation of a state machine of an exemplary dynamic force monitoring routine.

FIG. 7 shows a state transition diagram representing a state machine of the exemplary DFM routine. State transitions can occur every clock tick. Dashed and dotted lines are used for increased clarity only, and are not limiting. Exemplary states include a startup state 710 (one-time initialization), a stopped state 720 (the actuator 108 is not moving), an accelerating state 730 (the state in which the actuator 108 begins movement), peak-forward and peak-reverse states 740, 747 (the acceleration phase for either forward or reverse motions of the actuator 108), steady-state forward and reverse states 750, 757 (the steady-state phase for forward or reverse motions), a retrograde-motion state 760 (reversal of motion after detecting an obstruction), and a decelerating state 770 (the state in which the actuator 108 is slowing).

The startup state 710 initializes the expected steady-state feedback-signal value to the empty (no-load) value for the zone in which the component is located, then transitions to the stopped state 720 once initialization is complete ("READY"). The expected steady-state feedback-signal value is a value estimated, e.g., as described above with reference to FIG. 5, to correspond to normal operation with a given load. Rapid deviations of the feedback signal outside the acceptance range, e.g., more than a selected percentage above the expected value, can indicate the presence of an obstruction.

The stopped state 720 waits for the digital control loop to command a motion, then transitions to the accelerating state 730. The stopped state 720 can also inspect a configuration value and transition to the accelerating state 730 only if the value indicates DFM is enabled. The stopped state 720 can serve as a final state for, e.g., controlled shutdown of the processor 486, FIG. 4.

The accelerating state 730 inspects the motion command(s) from the digital control loop (e.g., the commanded velocity values) and transitions to either the peak-forward state 740 or the peak-reverse state 747 when the motion command(s) have exited a dead band around a no-motion value, either in the direction of forward motion or in the direction of reverse motion, respectively. The accelerating state 730 stores the direction of motion and updates the running averages for use by later states.

The peak-forward state 740 and the peak-reverse state 747 execute until the digital control loop has finished accelerating the actuator 108, after which the state 750, 757, respectively, is next. In the peak-forward and peak-reverse states 740, 747, at each tick in this example, the processor 486 determines whether the commanded velocity has switched polarity (from forward to reverse or vice versa). If so, the next state is the stopped state 720 ("SWITCH DIR") so that the DFM process will restart when the motor starts turning the opposite direction. The foregoing operation permits effectively performing DFM on multi-segment motions such as described above with reference to FIG. 1.

In the peak-forward and peak-reverse states 740, 747, steps 510, 520, 525, 530, all FIG. 5, can be carried out. The running averages are both used and updated during the peak-forward and peak-reverse states 740, 747. In various embodiments, the states 740, 747 perform the same processing, but using different configuration values appropriate to the respective direction of travel. Using different values permits taking into account, e.g., differences in required force when working with (aided) or against (resistive) load caused by passenger weight or an axis spring.

In this example, each tick, the processor 486 determines whether the commanded velocity has switched polarity (from forward to reverse or vice versa). If so, the next state is the stopped state 720 so that the DFM process will restart when the motor starts turning the opposite direction. If the move continues in the same direction as the move started, the running totals are updated. On the mth tick (e.g., the 40th tick) the feedback-signal averages and the feedback-signal and drive-signal slopes are calculated.

The acceleration phase of the motion is monitored, in this example, to determine the feedback-signal acceptance range to be stored for this move, based on reading the feedback signal value or average of values at the peak of the velocity command slope. In this example, the velocity command slope is debounced to assure the slope value has stabilized and is capturing the current data at the end of the acceleration phase. The debouncing is performed by recording, each mth tick, the highest value of velocity command slope yet seen. When that highest value has remained unchanged for j×m ticks (j≥1, e.g., j=2, 3 or 4), the processor 486 determines that the peak of the velocity command slope has been reached, and computes the feedback-signal acceptance range. Separately, the processor 486 also tracks the peak of motor current slope for use in the steady-state forward and reverse states 750, 757.

To determine the feedback-signal acceptance range in this example, the processor 486 first determines a reference feedback signal value (e.g., a reference current). The reference feedback signal can be equal to the average current over the last m ticks. The reference feedback signal can also be equal to the greater of that current and a selected percentage, e.g., 37%, of the initial expected steady-state feedback-signal value discussed above. The feedback-signal acceptance range can then be determined as a (zone-specific or overall) percentage of the reference feedback signal value. If the reference feedback signal value is lower than the initial value it typically means an aided-load condition; if it is higher it signifies a resistive load condition. The feedback-signal acceptance range can then be determined as, e.g., a range of drive currents from 0 A to the selected overcurrent percentage of the reference feedback signal value. That is, an obstruction will not be detected if the actuator is drawing 0 A, and will also not be detected for any current draw up to the percentage of the reference feedback signal value. In a hypothetical example of an aided-load condition, the initial expected steady-state feedback-signal value is 1 A, the average current is 0.2 A, and the overcurrent percentage for the present zone is 160%. The reference current is set to max (0.2 A, 1 A×37%), i.e., 0.37 A. The feedback-signal acceptance range is thus set to

[0 A, 160%×0.37 A], i.e., 0 A≤feedback signal value≤0.592 A. Feedback-signal acceptance ranges can be open or closed at each end, and can extend to ±∞ on one or both ends. Feedback-signal acceptance ranges can also include multiple disjoint, overlapping, or contiguous regions. In a hypothetical example in which the feedback signal represents speed and 42 (a.u.) is an expected speed in either direction, the feedback-signal acceptance range can be (−∞, −42]∪[42, ∞). In this hypothetical example, speeds less than 42 in either direction would indicate the presence of an obstruction.

Once the drive-signal slope value lowers to within a dead band around a steady-motion value, the processor 486 determines that the axis has stopped accelerating. The processor 486 then transitions to the steady-state forward state 750 or the steady-state reverse state 757 as appropriate. In an example, the motion command includes a sequence of velocity command values and the controller automatically transitions between the acceleration phase and the steady-state phase when the sequence of velocity command values exhibits a slope value less than a selected steady-state slope threshold. The steady-state slope threshold defines a range considered to be substantially zero commanded acceleration.

In this way, the calculated slopes are used to learn what the dynamic behavior of an axis is at run time and compare it to a reference for an empty seat. Using the actuator velocity profile or other drive-signal value sequence as a reference during the acceleration phase of the actuator movement permits accurately determining a baseline current for the system. The baseline may be higher or lower than the empty-seat reference current and is checked for reasonable bounds of operation. This permits determining how the axis is loaded, e.g., empty or bearing a heavy passenger.

During the steady-state forward state 750 and the steady-state reverse state 757, steps 540, 550, 560, 565, all FIG. 5, can be carried out. The running averages are both used and updated during the states 750, 757. In various embodiments, the steady-state forward and reverse states 750, 757 perform the same processing, but using different configuration values appropriate to the respective direction of travel. In the steady-state forward and reverse states 750, 757 and if the digital control loop reverses the direction of motion of the actuator 108 ("SWITCH DIR"), the next state is the stopped state 720, as discussed above. If an obstruction is detected through inspection of the feedback-signal values, the next state can be the retrograde-motion state 760, if retrograde motion is desired, or the stopped state 720, if not. If the digital control loop is no longer driving the actuator 108 above a selected speed threshold, the next state is the decelerating state 770.

In the steady-state forward and reverse states 750, 757, at each tick, the processor 486 determines whether the velocity command has changed polarity from the one saved by the accelerating state 730, i.e., whether the actuator is being commanded to change direction. If so, the stopped state 720 is next, as noted above. If the motion continues in the same direction as the motion started, the running totals are updated. Every ith tick and every mth tick, the relevant averages and slopes are computed.

Every ith tick, the first feedback-signal average is computed. The processor 486 determines whether the current slope (based on computations every mth tick) exceeds the (per-zone or overall) slope threshold. If so, an obstruction may be present. To check whether an obstruction is present, the ith-tick average feedback-signal value is compared to the feedback-signal acceptance range. If that average is not within that range, the processor 486 determines that an obstruction is present. In an example, the feedback signal acceptance range extends up to an obstruction-detection limit. If the feedback signal exceeds the obstruction-detection limit, an obstruction is detected. The next state is therefore the retrograde-motion state 760 (or the stopped state 720 if retrograde motion is not desired). Performing this comparison every ith tick rather than every mth tick (i<m) advantageously increases the frequency response of the DFM algorithm in detecting overcurrent conditions, e.g., unusual external loads above and beyond the normal variation due to the dynamics of the mechanical device and load.

As noted above, in an exemplary configuration, to recline a seatback, if the seat is empty, the downward steady state current is about 1.0 A as the actuator pushes against the biasing load of the spring. In this configuration, a rapid 20% increase in current (to 1.2 A) can be indicative of an obstruction. In contrast, with a 250 lb. person in the seat of this configuration, the steady-state current for the same downward movement is about 400 mA. While this is a significant change to the steady state current for the unloaded chair, the percentage of 20% (an increase to 480 mA) can still be used to indicate an obstruction. Using percentages together with dynamically-determined and—adjusted feedback-signal limits can permit effectively detecting obstructions in any zone, for any load.

In this example, the steady-state forward and reverse states 750, 757 include detection of a stalled actuator. Specifically, every mth tick, if the feedback-signal slope exceeds the peak of feedback-signal slope stored in the states 740, 747 by more than a selected (per-zone or overall) configuration percentage, the processor 486 determines that the actuator 108 has stalled, and transitions to the retrograde-motion state 760 (or the stopped state 720). This determination can be useful, e.g., if a briefcase or other rigid object is wedged between two seats, preventing motion of either seat frame towards the other.

In this example, step 540, FIG. 5, is used. Every mth tick, the feedback-signal acceptance range is updated based on the feedback-signal (current) slope or the drive-signal (velocity command) scope. The feedback-signal acceptance range is updated as it was originally computed in the peak-forward and peak-reverse states 740, 747 if the drive-signal slope is outside a selected dead band around constant velocity (e.g., outside a band around zero slope).

The feedback-signal acceptance range is also updated if the (optionally debounced) feedback-signal slope is outside a dead band around a no-change slope (e.g., zero). The feedback-signal acceptance range is updated as originally computed, discussed above, using the average feedback-signal value over the last m ticks. To debounce, when the feedback-signal slope excurses out of the dead band, the processor 486 waits k×m ticks (k≥1, e.g., j=2, 3 or 4) and then updates the feedback-signal acceptance range only if the current slope has been within the dead band over those k×m ticks. In this way, a step change to a different current will trigger an update in the feedback-signal acceptance range, but a spike of feedback signal (a rapid positive change, followed m ticks later by a rapid negative change) will not, since the rapid negative change will restart the k×m-tick waiting period. This permits compensating for, e.g., the mechanical effects of the spring assisting the seatback actuator 108 to raise the seat; other mechanical leverages; or weight distributions of components, passengers, or baggage. If the feedback-signal slope value is small in magnitude, meaning a relatively steady amount of current is being used, the time-varying feedback signals (changing due to spring force) can be used as new reference values over time.

In this example, processing in the steady-state forward and reverse states 750, 757 also includes step 550, FIG. 5. In this way, if a step change departs the feedback-signal acceptance range, an obstruction can be detected even during the debouncing period.

In the retrograde-motion state 760, step 565, FIG. 5, can be performed. Once the actuator has moved a selected distance opposite the motion during which the obstruction was detected, the next state is the decelerating state 770.

In the decelerating state 770, all the running averages and counters are cleared. In an embodiment, when motion has stopped, or if the direction of motion reverses, the next state is the stopped state 720. The stopped state 720 initializes internal variables in the processor 486 to prepare for the next move. In another embodiment, the decelerating state 770 is followed by the stopped state 720 without any condition checks.

Figure 8:
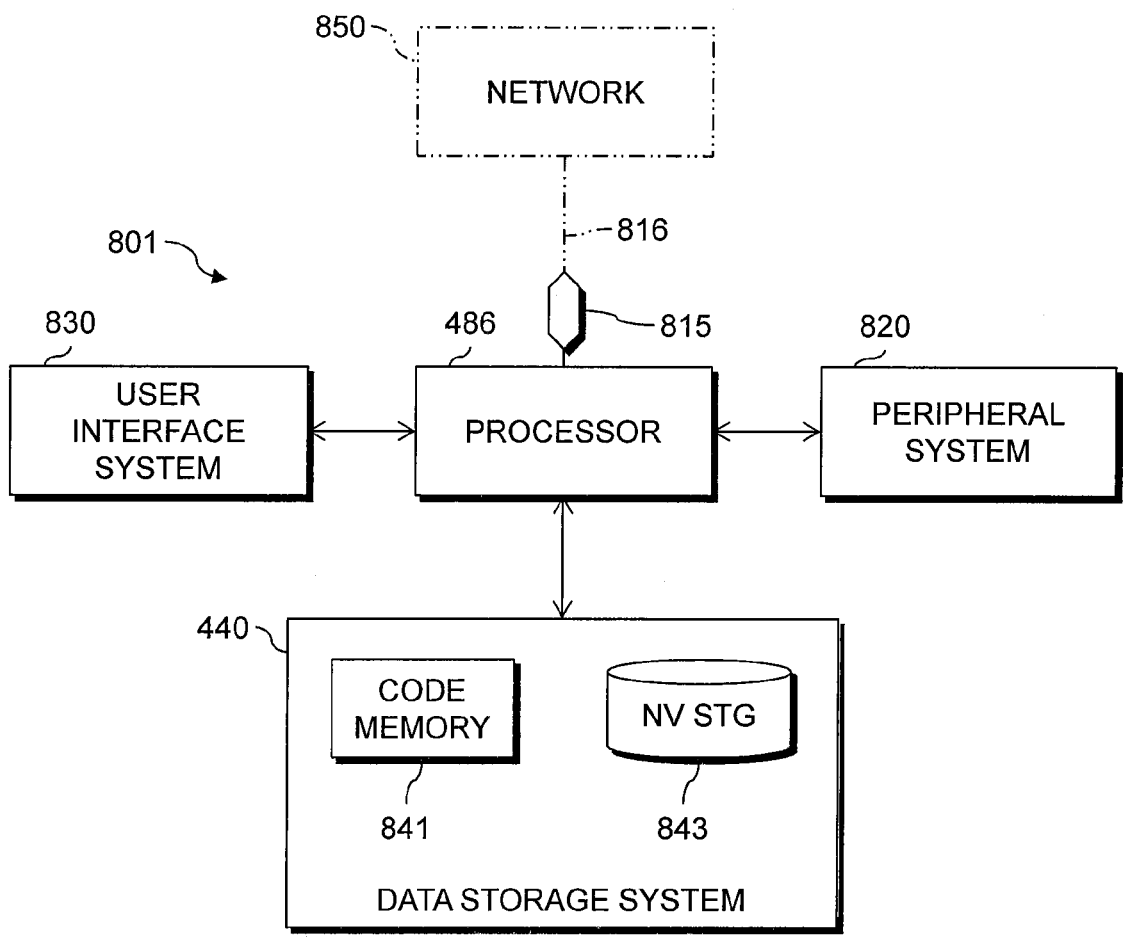
FIG. 8 is a high-level diagram showing elements of a data-processing system according to various embodiments.

FIG. 8 is a high-level diagram showing the components of an exemplary data-processing system 801 for analyzing data and performing other analyses described herein, and related components. The system 801 includes the processor 486, a peripheral system 820, a user interface system 830, and the data storage system 440. The peripheral system 820, the user interface system 830 and the data storage system 440 are communicatively connected to the processor 486. The processor 486 can be communicatively connected to a network 850 (shown in phantom), e.g., the Internet, a CAN bus, or an RS-485 bus, as discussed below. Any of the following can each include one or more of systems 486, 820, 830, 440, and can each connect to one or more network(s) 850: the controllers 186, 187, the actuators 108, 108A-108G, the sensor 123, or the devices 109A, 109B, all FIG. 1; the PCU 240, the IFE display 246, or the modules 222, all FIG. 2; or the processor 486, the bus interface 415, the power unit 426, the transmitter 468, the receiver 469, the actuator 108, the supply 488, or the ammeter 489, all FIG. 4. The processor 486, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

The processor 486 can implement processes of various aspects described herein. Exemplary processes are described above with reference to FIGS. 3, 4, 5, and 7. The processor 486 and related components can be embodied in one or more device(s) for automatically operating on data, e.g., a desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or controllers. These devices or controllers can be located in physical proximity or not. For example, subsystems such as the peripheral system 820, the user interface system 830, and the data storage system 440 are shown separately from the processor 486 but can be stored completely or partially within the processor 486.

The peripheral system 820 can include one or more devices configured to provide data to the processor 486 or receive data from the processor 486. In an example in which the system 801 embodies an actuator controller 187, FIG. 1, the peripheral system 820 can include interfaces to the actuators 108 or the sensors 123. The processor 486, upon receipt of data from a device in or connected to the peripheral system 820, can store such data in the data storage system 440. In an example in which the system 801 embodies a controller 186, FIG. 1, the peripheral system 820 can include interfaces to seat devices 109, FIG. 1

The user interface system 830 can include a mouse, a keyboard, a touchscreen, a keypad, another computer (connected, e.g., via a network or a null-modem cable), or any device or combination of devices from which data is input to the processor 486. The user interface system 830 also can include a display device, an IFE display 246, a processor-accessible memory, or any device or combination of devices to which data is output by the processor 486. The user interface system 830 and the data storage system 440 can share a processor-accessible memory.

In various aspects, the processor 486 includes or is connected to a communication interface 815 that is coupled via a network link 816 (shown in phantom) to the network 850. For example, the communication interface 815 can include an a CAN bus or RS-485 transceiver; a network interface to communicate data via a local-area network (LAN), e.g., an Ethernet LAN, or wide-area network (WAN); or a radio to communicate data via a wireless link, e.g., WiFi or GSM. The communication interface 815 sends and receives electrical, electromagnetic or optical signals that carry digital or analog data streams representing various types of information across the network link 816 between the processor 486 and the network 850. The network link 816 can be connected to the network 850 via a switch, gateway, hub, router, bridge, repeater, bus concentrator, or other networking device.

The data storage system 440 can include or be communicatively connected with one or more processor-accessible memories configured to store information. The memories can be, e.g., within a chassis or as parts of a distributed system. The phrase "processor-accessible memory" is intended to include any data storage device to or from which the processor 486 can transfer data (using appropriate components of the peripheral system 820), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 440 can be a tangible non-transitory computer-readable storage medium, i.e., a non-transitory device or article of manufacture that participates in storing instructions that can be provided to the processor 486 for execution.

In an example, the data storage system 440 includes a code memory 841, e.g., a flash drive, storing computer program instructions that can be executed directly from the Flash. In another example, the data storage system 440 includes the code memory 841, e.g., a RAM, and a nonvolatile storage device 843 ("NV STG"), e.g., a tangible computer-readable rotational storage device such as a hard drive. Computer program instructions are read into the code memory 841 from the nonvolatile storage device 843. In either example, the processor 486 then executes one or more sequences of the computer program instructions from the code memory 841, as a result performing process steps described herein. In this way, the processor 486 carries out a computer implemented process. For example, steps of methods described herein, blocks of the flowchart illustrations or block diagrams herein, and combinations of those, can be implemented by computer program instructions. The code memory 841 can also store data, or can store only code.

Various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into the processor 486 (and possibly also other controllers), to cause functions, acts, or operational steps of various aspects herein to be performed by the processor 486 (or other processor). Computer program code for carrying out operations for various aspects described herein may be written in any combination of one or more programming language(s), and can be loaded from the nonvolatile storage device 843 into the code memory 841 for execution. The program code may execute, e.g., entirely on the processor 486, partly on the processor 486 and partly on a remote computer connected to the network 850, or entirely on the remote computer.

In an example, the actuator controller 187, FIG. 4, is included in one of the modules 222, FIG. 2. The data storage system 440 can hold executable program code and data with configuration parameters that are specific to the particular module 222, and which are then invoked to perform computations relevant to the module 222 in response to command packets received from controller 186 via, e.g., the communication interface 815. The software loaded into the code memory 841 can include computer program instructions to execute the various functionalities of the module 222 as disclosed herein. Such computer program instructions may include executing a mathematical algorithm for operating a corresponding seat device 109 (e.g., an actuator 108) based on the overall system status. For example, the status information may include the last position of certain actuators 108 controlled by the other modules. The position of one or more of the modules can be an input parameter to the mathematical algorithm of a current module for computing an output (e.g., a target state). The actuator controller 187 can then operate and control the corresponding actuator 108 from a current state to the target state based on the computed output.

The powered seat control systems and methods described herein can be used for aircraft seats, automobile seats, massage chairs, or any other seat that uses electrical power to operate or control one or more functions of the seat, or to move one or more movable components of the seat. Exemplary embodiments of systems and methods described herein are suitable for use in passenger aircraft, e.g., piston, turboprop, or turbojet aircraft, or helicopters, balloons, or airships.

The invention is inclusive of combinations of the aspects described herein. References to "a particular aspect" (or "embodiment" or "version") and the like refer to features that are present in at least one aspect of the invention. Separate references to "an aspect" or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted. Discussion herein relating to currents exceeding thresholds also includes currents that become more negative than negative thresholds, or that otherwise are outside of ranges indicative of normal operation.

The invention has been described in detail with particular reference to certain preferred aspects thereof, but it will be understood that variations, combinations, and modifications can be effected by a person of ordinary skill in the art within the spirit and scope of the invention.

PARTS LIST FOR FIGS. 1-8

101, 101A, 101B, 101C, 102 powered seat assemblies
104 keypad
108 actuator
108A, 108B, 108C, 108D, 108E actuators
108F, 108G actuators
109A, 109B seat devices
110 leg rest
112 foot rest
114 back support
116 seat pan
118 privacy screen
120 lumbar bladder
122 seat frame
123 sensor
140 keypad
142 armrest
150 bar
151 pivot
152, 154 bars
155 pivot
156, 158 bars
161 rearward portion
162 forward portion
171 first end
186, 186A, 186B, 186C, 186D controllers
187 actuator controller
191 reference point
194 seat back
195 rotational axis
220 control system
222 module
222A, 222B actuator modules
222C lighting module
222D diagnostic module
222E power supply module
222F in-flight entertainment (IFE) module
222G passenger control unit (PCU) module
224, 224A, 224B, 224C communication buses
226 power source
240 passenger control unit
242 lights
244 lumbar bag
246 in-flight entertainment (IFE) display
310 central in-flight entertainment (IFE) unit
401 component
415 bus interface
426 power unit
440 data storage system
468 transmitter
469 receiver
486 processor
488 supply
489 ammeter
505, 510 steps
520 decision step
525 step
527 zone
530, 540 steps
550 decision step
560, 565 steps
601, 602, 603, 604, 605 zones
609, 634 curves
710 startup state
710 startup state
720 stopped state
730 accelerating state
740 peak-forward state
740 peak-forward state
740 peak-reverse states
747 peak-reverse state
750 steady-state forward state
757 steady-state reverse state
760 retrograde-motion state
770 decelerating state
815 communication interface
816 network link
820 peripheral system
830 user interface system
841 code memory
843 nonvolatile storage device
850 network

The invention claimed is:

1. A powered seat assembly configured to detect the presence of obstructions, the seat assembly comprising:
  a) a back support;
  b) a seat pan having a rearward portion associated with the back support;
  c) a leg rest having a first end associated with a forward portion of the seat pan, each of said back support, said seat pan and said leg rest being movable;
  d) one or more actuator(s) configured to move at least one of the back support, seat pan, and leg rest in response to one or more time-varying motion command(s), and to provide motion-status signal(s);
  e) a driver configured to provide the motion command(s) in response to a time-varying motion command and the motion-status signal(s);
  f) a sensor unit configured to monitor one or more time-varying feedback signal(s) of the actuator(s); and
  g) a controller configured to determine respective feedback-signal acceptance range(s) for at least one of the actuator(s) using value(s) of the respective feedback signal(s) monitored during an acceleration phase of motion of the respective actuator(s), and to terminate motion of the respective actuator(s) if the respective feedback signal(s) depart the respective feedback-signal acceptance range(s) during an acceleration phase of motion of the respective actuator(s), and in which the controller is further configured to determine respective feedback-signal acceptance range(s) for at least one of the actuator(s) using value(s) of the respective feedback signal(s) monitored during a steady-state phase of motion of the respective actuator(s), and to terminate motion of the respective actuator(s) if the respective feedback signal(s) depart the respective feedback-signal acceptance range(s) during a steady-state phase of motion of the respective actuator(s) wherein each feedback signal(s) is indicative of a detected obstruction on any part of the seat assembly including at least one of the movable back support, seat pan or leg rest.

2. The assembly according to claim 1, wherein the feedback signal(s) include one or more current signal(s) of the actuator(s).

3. The assembly according to claim 1, wherein the motion command(s) include one or more commanded velocities of the one or more actuator(s).

4. The assembly according to claim 1, wherein each of the one or more actuator(s) includes a brushed direct-current (BDC) or brushless direct-current (BLDC) motor.

5. The assembly according to claim 1, wherein the one or more actuator(s) includes a respective actuator for each of the back support, the seat pan, and the leg rest, each of the respective actuators responsive to a respective one of the motion command(s) and configured to provide respective ones of the motion-status signal(s).

6. The assembly according to claim 1, further including a vertically-movable armrest, wherein at least one of the actuator(s) is configured to move the armrest in response to the one or more time-varying motion command(s) and provide corresponding one(s) of the motion-status signal(s).

7. The assembly according to claim 1, further including a privacy screen, wherein at least one of the actuator(s) is configured to raise or lower the privacy screen in response to the one or more time-varying motion command(s) and provide corresponding one(s) of the motion-status signal(s).

8. The assembly according to claim 1, further including a seat frame supporting the back support, the seat pan, and the leg rest, wherein at least one of the actuator(s) is configured to move the seat frame laterally in response to the one or more time-varying motion command(s) and provide corresponding one(s) of the motion-status signal(s).

9. The assembly according to claim 1, wherein the controller includes a nonvolatile memory configured to store parameter(s) of at least one zone of motion of at least one of the actuator(s) and a processor connected to the memory and configured to determine the respective feedback-signal acceptance range(s) using ones of the stored parameter(s) corresponding to the respective actuator(s).

10. The assembly according to claim 1, further including an interface for receiving an indication of a desired motion, wherein the controller is responsive to the received indication to provide the motion command(s).

11. The assembly according to claim 10, wherein the interface includes at least one element selected from the group consisting of a keypad, a pushbutton, a touchscreen, and a wireless interface.

12. The assembly according to claim 1, wherein at least one of the actuator(s) is configured to move a respective component over a range of positions divided into a plurality of zones having respective values of a parameter, and the controller is configured to determining the feedback-signal acceptance range by determining one of the zones in which the respective component is located and determining the feedback-signal acceptance range using the respective parameter value of the determined one of the zones.

\* \* \* \* \*